US011553117B2

(12) United States Patent
Sugiyama

(10) Patent No.: US 11,553,117 B2
(45) Date of Patent: Jan. 10, 2023

(54) IMAGE PICKUP CONTROL APPARATUS, IMAGE PICKUP APPARATUS, CONTROL METHOD FOR IMAGE PICKUP CONTROL APPARATUS, AND NON-TRANSITORY COMPUTER READABLE MEDIUM

(71) Applicant: Sony Semiconductor Solutions Corporation, Kanagawa (JP)

(72) Inventor: Satoshi Sugiyama, Kanagawa (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 17/544,184

(22) Filed: Dec. 7, 2021

(65) Prior Publication Data
US 2022/0166908 A1 May 26, 2022

Related U.S. Application Data

(63) Continuation of application No. 16/648,997, filed as application No. PCT/JP2018/029570 on Aug. 7, 2018, now Pat. No. 11,228,696.

(30) Foreign Application Priority Data

Sep. 26, 2017 (JP) .............................. JP2017-184263

(51) Int. Cl.
*H04N 5/225* (2006.01)
*H04N 5/232* (2006.01)
(Continued)

(52) U.S. Cl.
CPC ........... *H04N 5/22521* (2018.08); *H04N 5/04* (2013.01); *H04N 5/232411* (2018.08); *H04N 9/09* (2013.01)

(58) Field of Classification Search
CPC .................................................. H04N 5/22521
(Continued)

(56) References Cited

U.S. PATENT DOCUMENTS

| 2003/0071913 | A1 | 4/2003 | Yoshida |
| 2011/0145549 | A1 | 6/2011 | Suk et al. |

(Continued)

FOREIGN PATENT DOCUMENTS

| CN | 101111748 A | 1/2008 |
| CN | 1056163028 A | 12/2015 |

(Continued)

OTHER PUBLICATIONS

"Hysteresis", Wikipedia Article, pp. 1-15, Dec. 30, 2014.
(Continued)

*Primary Examiner* — Joel W Fosselman
(74) *Attorney, Agent, or Firm* — Michael Best & Friedrich LLP

(57) ABSTRACT

To reduce power consumption in an image pickup apparatus that captures a plurality of pieces of image data.

An image pickup apparatus includes a signal processing unit and a control unit. The signal processing unit executes, in accordance with a predetermined control signal, either compound-eye processing for synthesizing a plurality of pieces of image data by carrying out signal processing on each of the plurality of pieces of image data or monocular processing for carrying out the signal processing on any one of the plurality of pieces of image data. The control unit supplies the predetermined control signal to the signal processing unit and causes one of the compound-eye processing and the monocular processing to be switched to the other one of the compound-eye processing and the monocular processing, on
(Continued)

a basis of a result of a comparison between a measured predetermined physical amount and a predetermined threshold value.

19 Claims, 17 Drawing Sheets

(51) Int. Cl.
*H04N 5/04* (2006.01)
*H04N 9/09* (2006.01)

(58) Field of Classification Search
USPC .......................................................... 348/154
See application file for complete search history.

(56) References Cited

U.S. PATENT DOCUMENTS

| | | | | |
|---|---|---|---|---|
| 2016/0014314 | A1* | 1/2016 | Laroia | H04N 5/23245 348/273 |
| 2017/0078561 | A1* | 3/2017 | Wang | H04N 5/23216 |

FOREIGN PATENT DOCUMENTS

| | | |
|---|---|---|
| CN | 105872474 A | 8/2016 |
| CN | 106791379 A | 5/2017 |
| CN | 106973209 A | 7/2017 |
| CN | 106993136 A | 7/2017 |
| JP | H08265804 A | 10/1996 |
| JP | 2002090851 A | 3/2002 |
| JP | 2009081693 A | 4/2009 |
| JP | 2011-239260 A | 11/2011 |
| JP | 2015005932 A | 1/2015 |
| JP | 2015041852 A | 3/2015 |
| JP | 2016119693 A | 6/2016 |
| JP | 2017158075 A | 9/2017 |

OTHER PUBLICATIONS

Chinese Office Action dated Feb. 2, 2021 for corresponding Chinese Application No. 201880060598.X.

Japanese Office Action dated Aug. 10, 2021 for corresponding Japanese Application No. 2017-184263.

* cited by examiner a b a b

IMAGE PICKUP CONTROL APPARATUS, IMAGE PICKUP APPARATUS, CONTROL METHOD FOR IMAGE PICKUP CONTROL APPARATUS, AND NON-TRANSITORY COMPUTER READABLE MEDIUM

CROSS REFERENCES TO RELATED APPLICATIONS

The present Application is a Continuation Application of U.S. patent application Ser. No. 16/648,997 filed Mar. 19, 2020, which is a 371 National Stage Entry of International Application No.: PCT/JP2018/029570, filed on Aug. 7, 2018, which in turn claims priority from Japanese Application No. 2017-184263, filed on Sep. 26, 2017, the entire contents of which are incorporated herein by reference.

TECHNICAL FIELD

The present technology relates to an image pickup control apparatus, an image pickup apparatus, a control method for the image pickup control apparatus, and a non-transitory computer readable medium more specifically, to an image pickup control apparatus including a plurality of solid-state image pickup devices, an image pickup apparatus, a control method for the image pickup control apparatus, and a non-transitory computer readable medium.

BACKGROUND ART

From the past, for simultaneously capturing a plurality of pieces of image data, a compound-eye image pickup apparatus including a plurality of solid-state image pickup devices has been used. For example, there is proposed an image pickup apparatus that captures color image data using a solid-state image pickup device including a color filter, and captures monochrome image data using a solid-state image pickup device including no color filter (see, for example, Patent Literature 1). Here, since incident light is not attenuated by a color filter, the monochrome image data becomes that much brighter than the color image data. This image pickup apparatus simultaneously captures and synthesizes those color image data and monochrome image pickup data.

CITATION LIST

Patent Literature

[PTL 1]
JP2011-239260

SUMMARY

Technical Problem

According to the technology of the past described above, by synthesizing relatively-bright monochrome image data with color image data, color image data that is brighter than that in a case where the image data is not synthesized can be generated. However, since a processing amount of synthesis processing for synthesizing a plurality of pieces of image data is larger than that in a case of processing one piece of image data, there is a problem that power consumption of the image pickup apparatus is increased as compared to the case where the image data is not synthesized. As the power consumption increases, there is a fear that a lowering speed of a remaining battery amount of the image pickup apparatus and a heat generation amount of the image pickup apparatus will increase, so it is desirable to reduce power consumption.

The present technology has been made in view of the circumstances as described above and aims at reducing power consumption in an image pickup apparatus that captures a plurality of pieces of image data.

Solution to Problem

The present technology has been made to solve the problems described above, and according to a first aspect of the present technology, there is provided an image pickup control apparatus including: a signal processing unit that executes, in accordance with a predetermined control signal, either compound-eye processing for synthesizing a plurality of pieces of image data by carrying out signal processing on each of the plurality of pieces of image data or monocular processing for carrying out the signal processing on any one of the plurality of pieces of image data; and a control unit that supplies the predetermined control signal to the signal processing unit and causes one of the compound-eye processing and the monocular processing to be switched to the other one of the compound-eye processing and the monocular processing, on a basis of a result of a comparison between a measured predetermined physical amount and a predetermined threshold value, and a control method therefor. Accordingly, an operation that the processing of the signal processing unit is switched from one of the compound-eye processing and the monocular processing to the other one of the compound-eye processing and the monocular processing in accordance with the physical amount can be obtained.

Further, in this first aspect, the predetermined physical amount may be a physical amount that fluctuates in accordance with an image pickup environment. Accordingly, an operation that the processing of the signal processing unit is switched from one of the compound-eye processing and the monocular processing to the other one of the compound-eye processing and the monocular processing in accordance with the image pickup environment can be obtained.

Further, in this first aspect, the image pickup control apparatus may further include a temperature sensor that measures a temperature as the predetermined physical amount, and the control unit may cause the compound-eye processing to be switched to the monocular processing in a case where the temperature is higher than the predetermined threshold value. Accordingly, an operation that the processing of the signal processing unit is switched from the compound-eye processing to the monocular processing in a case where the temperature is higher than the threshold value can be obtained.

Further, in this first aspect, the signal processing unit may include processing of measuring a light amount of incident light as the predetermined physical amount and acquiring the light amount as a photometric amount, and the control unit may cause the compound-eye processing to be switched to the monocular processing in a case where the photometric amount is larger than the predetermined threshold value. Accordingly, an operation that the processing of the signal processing unit is switched from the compound-eye processing to the monocular processing in a case where the photometric amount is larger than the threshold value can be obtained.

Further, in this first aspect, the signal processing unit may include processing of measuring a movement amount of a subject as the predetermined physical amount, and the control unit may cause the monocular processing to be switched to the compound-eye processing in a case where the movement amount is larger than the predetermined threshold value. Accordingly, an operation that the processing of the signal processing unit is switched from the monocular processing to the compound-eye processing in a case where the movement amount of the subject is larger than the threshold value can be obtained.

Further, in this first aspect, the plurality of pieces of image data may be images captured in synchronization with predetermined synchronization signals, and the signal processing unit may switch one of the compound-eye processing and the monocular processing to the other one of the compound-eye processing and the monocular processing after executing transition processing for performing a synthesis while changing a synthesis ratio every time a predetermined cycle passes. Accordingly, an operation that the processing is switched after gradually changing the synthesis ratio can be obtained.

Further, according to a second aspect of the present technology, there is provided an image pickup control apparatus including: a synthesis processing unit that synthesizes a plurality of pieces of image data and outputs the data as synthetic image data; a transmission unit that executes, in accordance with a predetermined control signal, either single-channel transmission processing for transmitting the synthetic image data together with a single piece of image data as any one of the plurality of pieces of image data via a single communication channel or multiple-channel transmission processing for respectively transmitting the single piece of image data and the synthetic image data via mutually different communication channels; and a control unit that supplies the predetermined control signal to the signal processing unit and causes one of the single-channel transmission processing and the multiple-channel transmission processing to be switched to the other one of the single-channel transmission processing and the multiple-channel transmission processing, on a basis of a result of a comparison between a measured predetermined physical amount and a predetermined threshold value. Accordingly, an operation that one of the single-channel transmission processing and the multiple-channel transmission processing is switched to the other one of the single-channel transmission processing and the multiple-channel transmission processing in accordance with the physical amount can be obtained.

Further, in this second aspect, the image pickup apparatus may further include a scaling processing unit that reduces any one of the plurality of pieces of image data, and the control unit may control the scaling processing unit to change a reduction ratio on the basis of the result of the comparison between the predetermined physical amount and the predetermined threshold value. Accordingly, an operation that the reduction ratio is changed in accordance with the physical amount can be obtained.

Further, in this second aspect, the image pickup apparatus may further include a synchronization control unit that supplies a predetermined synchronization signal, each of the plurality of pieces of image data may be image data that has been captured in synchronization with the predetermined synchronization signal, and the control unit may control the synchronization control unit to change a frequency of the predetermined synchronization signal on the basis of the result of the comparison between the predetermined physical amount and the predetermined threshold value. Accordingly, an operation that the frequency of the synchronization signal is changed in accordance with the physical amount can be obtained.

Further, according to a third aspect of the present technology, there is provided an image pickup apparatus including: a camera module that captures a plurality of pieces of image data; a signal processing unit that executes, in accordance with a predetermined control signal, either compound-eye processing for synthesizing the plurality of pieces of image data by carrying out signal processing on each of the plurality of pieces of image data or monocular processing for carrying out the signal processing on any one of the plurality of pieces of image data; and a control unit that supplies the predetermined control signal to the signal processing unit and causes one of the compound-eye processing and the monocular processing to be switched to the other one of the compound-eye processing and the monocular processing, on a basis of a result of a comparison between a measured predetermined physical amount and a predetermined threshold value. Accordingly, an operation that the processing on the image data from the camera module is switched from one of the compound-eye processing and the monocular processing to the other one of the compound-eye processing and the monocular processing in accordance with the physical amount can be obtained.

Advantageous Effects of Invention

According to the present technology, it is possible to achieve an excellent effect that power consumption can be reduced in an image pickup apparatus that captures a plurality of pieces of image data. It should be noted that the effects described herein are not necessarily limited, and any of the effects described in the present disclosure may be obtained.

Figure 1:
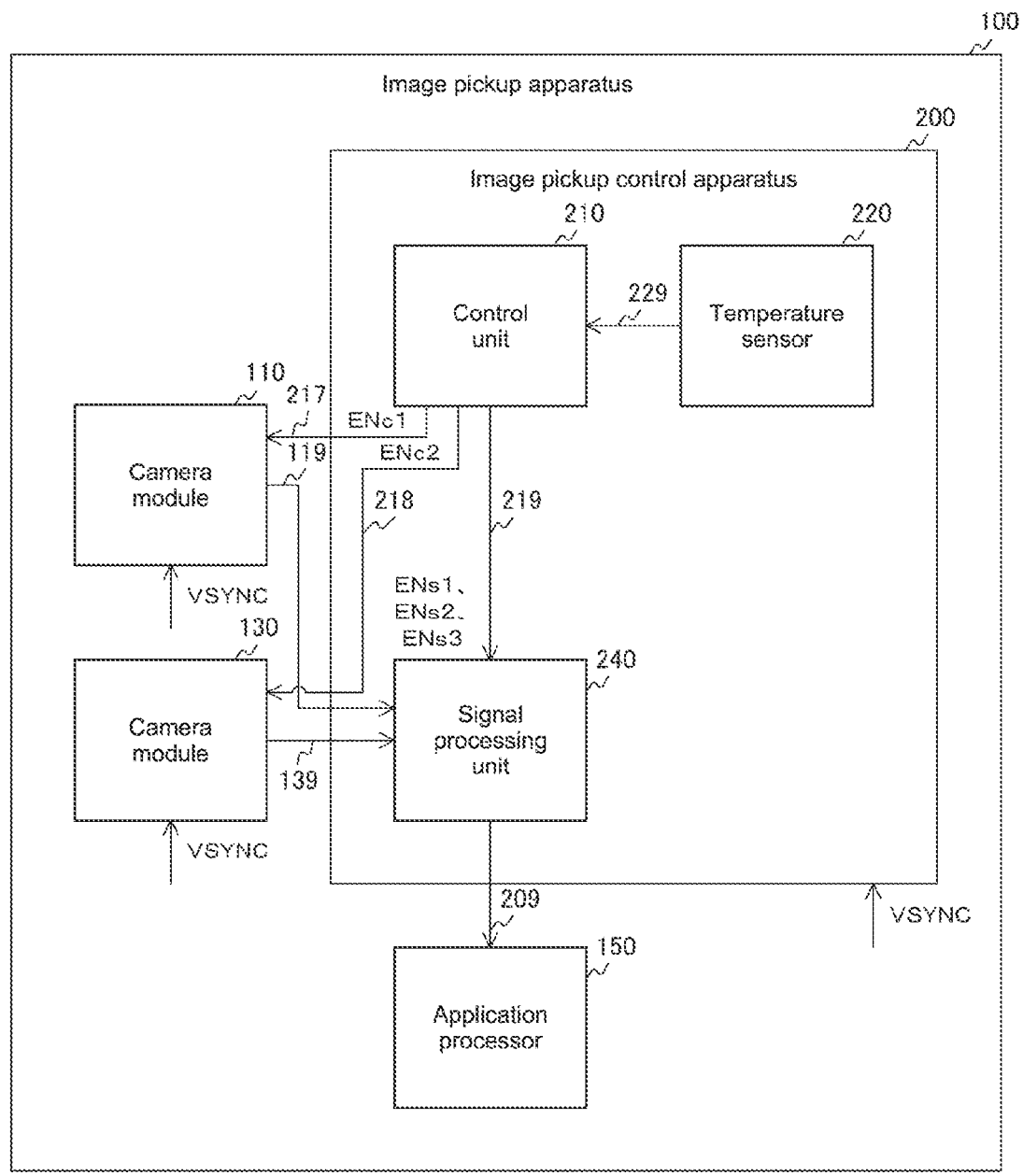
FIG. 1

A block diagram showing a configuration example of an image pickup apparatus according to a first embodiment of the present technology.

FIG. 2

Block diagrams showing a configuration example of a camera module according to the first embodiment of the present technology.

FIG. 3

An example of a cross-sectional diagram of a solid-state image pickup device according to the first embodiment of the present technology.

FIG. 4

A block diagram showing a configuration example of a signal processing unit according to the first embodiment of the present technology.

FIG. 5

A block diagram showing a configuration example of a color image signal processing unit according to the first embodiment of the present technology.

FIG. 6

A block diagram showing a configuration example of a synthesis processing unit according to the first embodiment of the present technology.

FIG. 7

A timing chart showing an example of an operation of the image pickup apparatus according to the first embodiment of the present technology.

FIG. 8

A block diagram showing an example of a state of the image pickup apparatus in a case where synthesis processing is not carried out in the first embodiment of the present technology.

FIG. 9

A flowchart showing an example of an operation of the image pickup apparatus according to the first embodiment of the present technology.

FIG. 10

A block diagram showing a configuration example of an image pickup apparatus according to a first modified example of the first embodiment of the present technology.

FIG. 11

A block diagram showing a configuration example of a signal processing unit according to the first modified example of the first embodiment of the present technology.

FIG. 12

A block diagram showing a configuration example of a color image signal processing unit according to a second modified example of the first embodiment of the present technology.

FIG. 13

A block diagram showing a configuration example of a signal processing unit according to a second embodiment of the present technology.

FIG. 14

A block diagram showing a configuration example of an application processor according to the second embodiment of the present technology.

FIG. 15

A block diagram showing a configuration example of an image pickup apparatus according to a modified example of the second embodiment of the present technology.

FIG. 16

A block diagram showing a schematic configuration example of a vehicle control system.

FIG. 17

An explanatory diagram showing an example of a setting position of an image pickup unit.

DESCRIPTION OF EMBODIMENTS

Hereinafter, modes for embodying the present technology (hereinafter, referred to as embodiments) will be described. Descriptions will be given in the following order.

1. First embodiment (example of switch from compound-eye processing to monocular processing when temperature is higher than threshold value)

2. Second embodiment (example of switch from 2 channels to 1 channel when temperature is higher than threshold value)

3. Application example to mobile object

1. First Embodiment

"Configuration Example of Image Pickup Apparatus"

FIG. 1 is a block diagram showing a configuration example of an image pickup apparatus 100 according to a first embodiment of the present technology. This image pickup apparatus 100 captures image data and includes camera modules 110 and 130, an image pickup control apparatus 200, and an application processor 150. As the image pickup apparatus 100, a smartphone, an action cam, an IoT (Internet of Things) camera, an in-vehicle camera, and the like are assumed.

The camera modules 110 and 130 capture image data in synchronization with a vertical synchronization signal VSYNC having a predetermined frequency (30 hertz, etc.). These camera modules 110 and 130 simultaneously capture image data in synchronization with the same vertical synchronization signal VSYNC. Then, the camera module 110 supplies the image data to the image pickup control apparatus 200 via a signal line 119, and the camera module 130 supplies the image data to the image pickup control apparatus 200 via a signal line 139.

Also, the camera module 110 operates or stops in accordance with an enable signal ENc1 from the image pickup control apparatus 200, and the camera module 130 operates or stops in accordance with an enable signal ENc2 from the image pickup control apparatus 200. The enable signal ENc1 is transmitted via a signal line 217, and the enable signal ENc2 is transmitted via a signal line 218.

The image pickup control apparatus 200 controls an image pickup operation of the image pickup apparatus 100 and includes a control unit 210, a temperature sensor 220, and a signal processing unit 240.

The temperature sensor 220 measures a temperature of the image pickup apparatus 100. This temperature sensor 220 supplies temperature data indicating a measurement value to the control unit 210 via a signal line 229.

The signal processing unit 240 carries out predetermined signal processing on two pieces of image data from the camera modules 110 and 130. Under control of the control unit 210, this signal processing unit 240 executes compound-eye processing or monocular processing. Here, the compound-eye processing is processing of carrying out signal processing on each of the two pieces of image data and synthesizing them. Further, the monocular processing is processing of carrying out signal processing on only one of the two pieces of image data. The signal processing unit 240 supplies the processed image data to the application processor 150 via a signal line 209.

Further, the signal processing unit 240 controls an exposure amount of the camera modules 110 and 130 and a position of a focus lens.

The application processor 150 executes various types of image processing such as object recognition processing and filter processing on image data from the signal processing unit 240. For example, this application processor 150 records processed image data in a nonvolatile memory (not shown) or the like. Further, for example, the application processor 150 supplies the processed image data to a display apparatus (not shown) for display.

The control unit 210 controls the camera modules 110 and 130 and the signal processing unit 240 on the basis of a result of a comparison between a measured predetermined physical amount and a predetermined threshold value. It is desirable for the physical amount to be measured to fluctuate in accordance with an image pickup environment. A temperature is used as such a physical amount, for example. When a predetermined application for performing image pickup is executed, the control unit 210 supplies the enable signals ENc1 and ENc2 to the signal processing unit 240 to operate both of the camera modules 110 and 130. In addition, at that time, the control unit 210 supplies enable signals ENs1, ENs2, and ENs3 to the signal processing unit 240 to cause the signal processing unit 240 to execute the compound-eye processing. Details of the enable signals ENs1 to ENs3 will be described later. These enable signals ENs1 to ENs3 are transmitted via a signal line 219. It should be noted that the enable signals ENs1, ENs2, and ENs3 are examples of a control signal described in the scope of claims.

Then, the control unit 210 monitors the temperature and determines whether or not the temperature is higher than a predetermined upper limit threshold value. When the temperature becomes higher than the upper limit threshold value, the control unit 210 supplies the enable signals ENs1, ENs2, and ENs3 to the signal processing unit 240 to control the signal processing unit 240 to start a switch from the compound-eye processing to the monocular processing. Then, when the switch is completed, the control unit 210 supplies the enable signal ENc1 or ENc2 to the signal processing unit 240 to stop one of the camera modules 110 and 130.

In this way, when the temperature becomes higher than the upper limit threshold value, one of the camera modules 110 and 130 is stopped and a switch is made to the monocular processing, with the result that power consumption is reduced, and a temperature rise is suppressed.

Further, after switching to the monocular processing, the control unit 210 determines whether or not the temperature is lower than a predetermined lower limit threshold value. When the temperature becomes lower than the lower limit threshold value, the control unit 210 controls the signal processing unit 240 by the enable signals ENs1, ENs2, and ENs3 to start a switch from the monocular processing to the compound-eye processing. Then, when the switch is completed, the control unit 210 causes both of the camera modules 110 and 130 to operate by the enable signals ENc1 and ENc2.

"Configuration Example of Camera Module"

Figure 2:
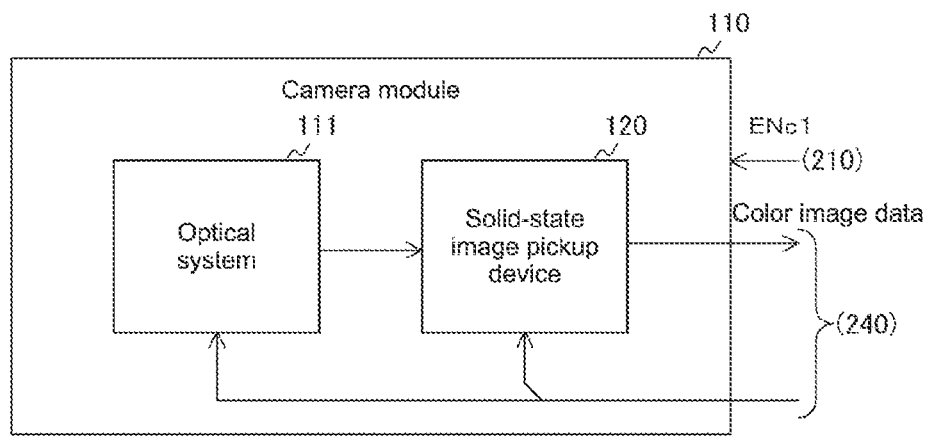
Figure 2:
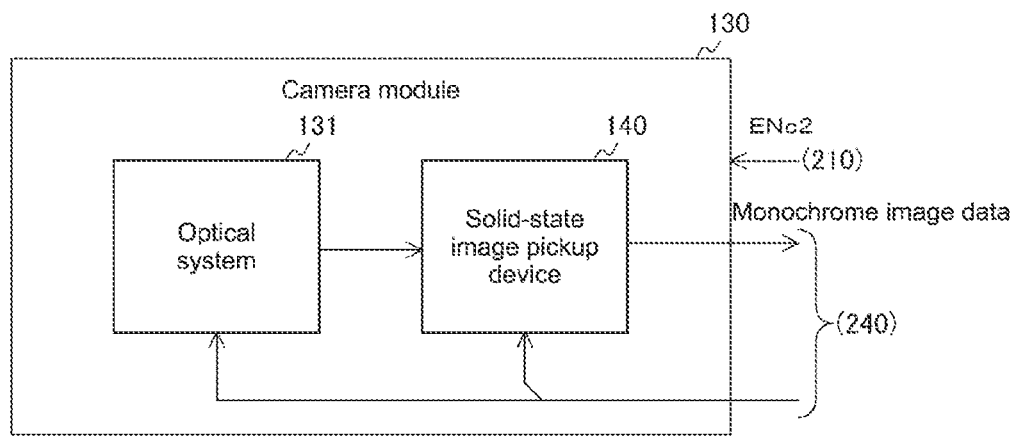

FIG. 2 are block diagrams showing a configuration example of the camera modules 110 and 130 according to the first embodiment of the present technology. "a" in the figures is a block diagram showing a configuration example of the camera module 110, and "b" in the figures is a block diagram showing a configuration example of the camera module 130.

The camera module 110 includes an optical system 111 and a solid-state image pickup device 120. The optical system 111 is constituted of a plurality of optical components including a diaphragm and a focus lens, and collects incident light and guides it to the solid-state image pickup device 120. The solid-state image pickup device 120 captures color image data including color information and luminance information in synchronization with the vertical synchronization signal VSYNC.

The signal processing unit 240 controls an aperture value of the optical system 111 and an exposure time of the solid-state image pickup device 120 to set an exposure amount to an appropriate value. In addition, the signal processing unit 240 controls a position of the focus lens of the optical system 111 for focus.

Further, the camera module 130 includes an optical system 131 and a solid-state image pickup device 140. A configuration of the optical system 131 is similar to that of the optical system 111. The solid-state image pickup device 140 captures monochrome image data including only luminance information in synchronization with the vertical synchronization signal VSYNC. The signal processing unit 240 also controls an exposure amount and focal point of the camera module 130.

It should be noted that although the optical system 111 and solid-state image pickup device 120 and the optical system 131 and solid-state image pickup device 140 are arranged in separate camera modules, all of them may be arranged in a single camera module.

Figure 3:
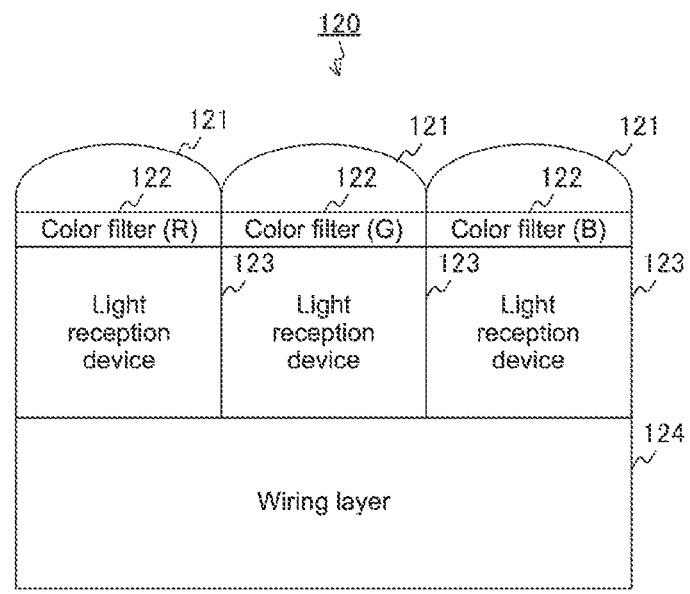
Figure 3:
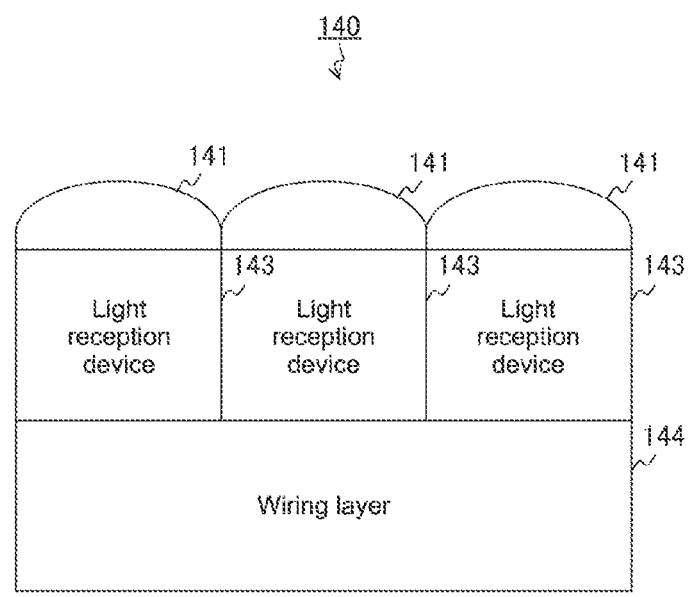

FIG. 3 are an example of cross-sectional diagrams of the solid-state image pickup devices 120 and 140 according to the first embodiment of the present technology. "a" in the figures is an example of the cross-sectional diagram of the solid-state image pickup device 120, and "b" in the figures is an example of the cross-sectional diagram of the solid-state image pickup device 140.

On a light reception surface of the solid state image pickup device 120, a microlens 121 is provided for each pixel. A color filter 122 is provided below each of the microlenses 121 with a direction that is directed from the microlens 121 toward a focal point being a downward direction. A light reception device 123 is arranged below each of the color filters 122. This color filter 122 transmits light having any of a red wavelength, a green wavelength, and a blue wavelength. By performing a photoelectric conversion on those transmitted light, color image data in which respective pixel signals of R (Red), G (Green) and B (Blue) are arranged in a two-dimensional lattice is generated. A wiring layer 124 is provided below the light reception devices 123. With the wiring layer 124 being a front surface, the solid-state image pickup device 120 in which light is irradiated onto a back surface with respect to the front surface as described above, is called a back-irradiation-type solid-state image pickup device.

On a light reception surface of the solid-state image pickup device 140, a microlens 141 are provided for each pixel. A light reception device 143 is provided below each of the microlenses 141. A wiring layer 144 is provided below the light reception devices 143. Since the solid-state image pickup device 140 does not include a color filter, monochrome image data is captured by the solid-state image pickup device 140. In addition, since incident light is not attenuated by the color filter in the solid-state image pickup device 140, monochrome image data that is brighter than color image data can be obtained under light sources of the same light amount.

It should be noted that although the back-irradiation-type solid-state image pickup device is used as the solid-state image pickup devices 120 and 140, a front-irradiation-type solid-state image pickup device can also be used.

"Configuration Example of Signal Processing Unit"

Figure 4:
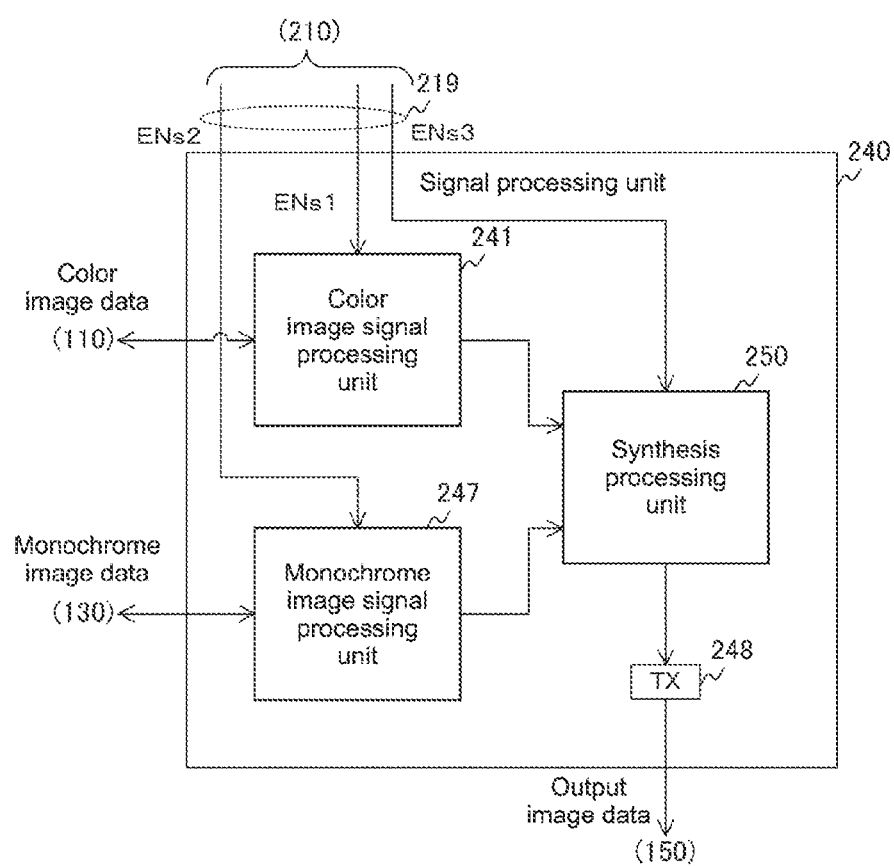

FIG. 4 is a block diagram showing a configuration example of the signal processing unit 240 according to the first embodiment of the present technology. This signal processing unit 240 includes a color image signal processing unit 241, a monochrome image signal processing unit 247, a synthesis processing unit 250, and a transmission unit 248.

The color image signal processing unit 241 executes predetermined signal processing on color image data from the camera module 110. This color image signal processing unit 241 supplies the processed color image data to the synthesis processing unit 250. Further, the color image signal processing unit 241 operates or stops in accordance with the enable signal ENs1 from the control unit 210.

The monochrome image signal processing unit 247 executes predetermined signal processing on monochrome image data from the camera module 130. This monochrome image signal processing unit 247 supplies the processed monochrome image data to the synthesis processing unit 250. Further, the monochrome image signal processing unit 247 operates or stops in accordance with the enable signal ENs2 from the control unit 210.

The synthesis processing unit 250 synthesizes color image data and monochrome image data that have been subjected to signal processing. This synthesis processing unit 250 synthesizes the color image data and the monochrome image data in synchronization with the vertical synchronization signal VSYNC to generate synthetic image data. Then, the synthesis processing unit 250 changes a synthesis ratio in accordance with the enable signal ENs3 from the control unit 210. Here, the enable signal ENs3 is a signal for instructing either a start or an end of a synthesis. A method of changing a synthesis ratio will be described later. The synthesis processing unit 250 supplies the processed image data to the transmission unit 248 as output image data.

The transmission unit 248 transmits output image data. This transmission unit 248 transmits output image data to the application processor 150 in accordance with an MIPI (Mobile Industry Processor Interface) standard, for example.

Figure 5:
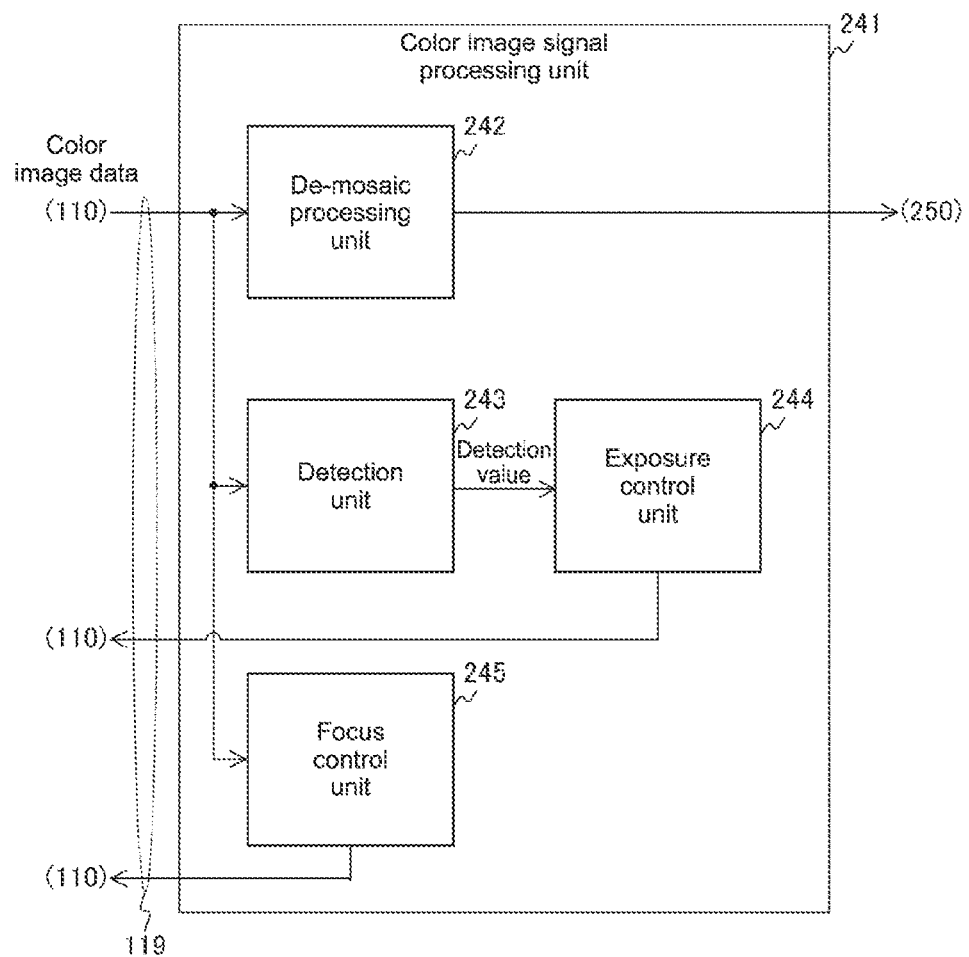

FIG. 5 is a block diagram showing a configuration example of the color image signal processing unit 241 according to the first embodiment of the present technology. This color image signal processing unit 241 includes a de-mosaic processing unit 242, a detection unit 243, an exposure control unit 244, and a focus control unit 245.

The de-mosaic processing unit 242 carries out de-mosaic processing for interpolating, for each pixel, insufficient color information from surrounding pixels, on the color image data. By the de-mosaic processing, color image data including R, G, and B signals for each pixel is generated. This de-mosaic processing unit 242 supplies the color image data subjected to the de-mosaic processing to the synthesis processing unit 250. It should be noted that in addition to the de-mosaic processing, the color image signal processing unit 241 may further execute other processing such as filter processing and defective pixel interpolation processing.

The detection unit 243 measures a light amount of incident light from the color image data and acquires it as a photometric amount. For example, the photometric amount can be obtained as a detection value by a center-weighted photometry method or a spot photometry method. The detection unit 243 supplies the detection value (photometric amount) to the exposure control unit 244.

The exposure control unit 244 controls an exposure amount to an appropriate value on the basis of the detection value. This exposure control unit 244 controls an aperture value and exposure time of the camera module 110 to set the exposure amount to an appropriate value.

The focus control unit 245 focuses the camera module 110. This focus control unit 245 detects a position in focus using, for example, an image plane phase difference detection method or a contrast detection method, for example, and moves the focus lens of the camera module 110 to that position.

The configuration of the monochrome image signal processing unit 247 is similar to that of the color image signal processing unit 241 except that the de-mosaic processing is not executed.

"Configuration Example of Synthesis Processing Unit"

Figure 6:
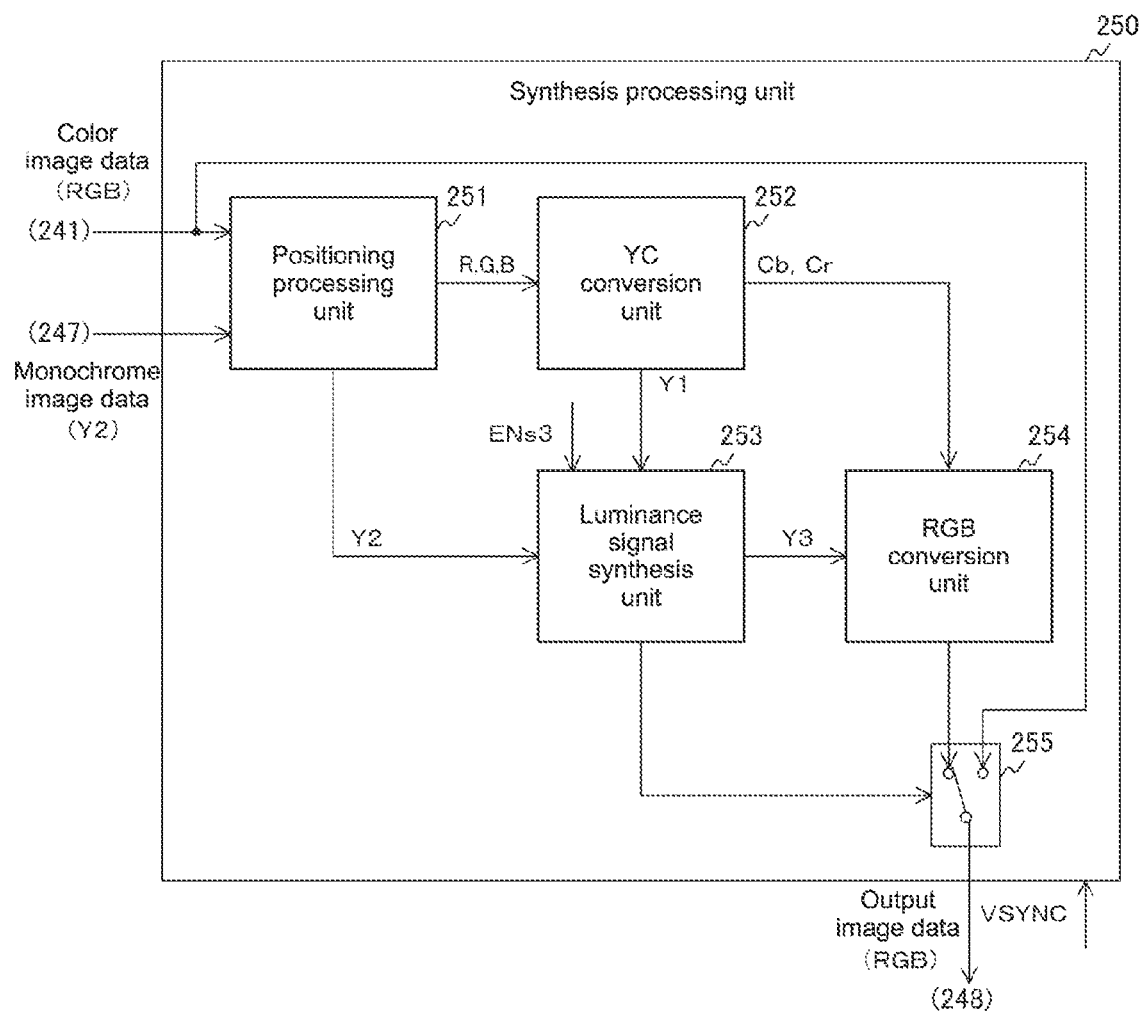

FIG. 6 is a block diagram showing a configuration example of the synthesis processing unit 250 according to the first embodiment of the present technology. This synthesis processing unit 250 includes a positioning processing unit 251, a YC conversion unit 252, a luminance signal synthesis unit 253, an RGB conversion unit 254, and a switch 255.

The positioning processing unit 251 positions the color image data and the monochrome image data. This positioning processing unit 251 corrects a positional deviation between the two pieces of image data, that is due to an attachment error or disparity of the camera modules 110 and 130, by a parallel movement, a rotation, or the like. The positioning processing unit 251 supplies the positioned color image data to the YC conversion unit 252 and supplies the monochrome image data to the luminance signal synthesis unit 253.

The YC conversion unit 252 converts, for each pixel in the color image data, R, G, and B signals into a luminance signal Y1 and color difference signals Cb and Cr by the following expressions.

$$Y1 = 0.257R + 0.504G + 0.098B + 16$$

$$Cb = -0.148R - 0.291G + 0.439B + 128$$

$$Cr = 0.439R - 0.368G - 0.071B + 128$$

The YC conversion unit 252 supplies the luminance signal Y1 to the luminance signal synthesis unit 253 and supplies the color difference signals Cb and Cr to the RGB conversion unit 254.

The luminance signal synthesis unit 253 synthesizes the luminance signal Y1 of the color image data and a luminance signal Y2 of the monochrome image data for each pixel in accordance with the following expression.

$$Y3 = Y1*(A/100) + Y2*(1-A)/100$$

In the above expression, A represents a synthesis ratio in a percentage, and Y3 represents a luminance signal obtained after the synthesis.

The luminance signal synthesis unit 253 supplies the luminance signal Y3 obtained after the synthesis to the RGB conversion unit 254.

The RGB conversion unit 254 converts the luminance signal Y3 and the color difference signals Cr and Cb into R, G, and B signals for each pixel by the following expressions. The RGB conversion unit 254 supplies the converted image data to the switch 255.

$$R = 1.164(Y3-16) - 1.596(Cr-128)$$

$$G = 1.164(Y3-16) - 0.391(Cb-128) - 0.813(Cr-128)$$

$$B = 1.164(Y3-16) - 2.018(Cb-128)$$

The switch 255 selects either the image data from the RGB conversion unit 254 or the color image data from the color image signal processing unit 241 under control of the luminance signal synthesis unit 253. In an initial state, the image data from the RGB conversion unit 254 is selected. This switch 255 supplies the selected image data to the transmission unit 248 as output image data.

As a synthesis start is instructed by the enable signal ENs3, the luminance signal synthesis unit 253 sets an initial value (e.g., "0") of a synthesis ratio A and starts the synthesis. Then, when a synthesis end is instructed by the enable signal ENs3 after the start of the synthesis, the luminance signal synthesis unit 253 executes transition processing for increasing the synthesis ratio A every time a frame cycle, which is a cycle of the vertical synchronization signal VSYNC, passes. For example, in a case where the synthesis ratio A is incremented by "10" percent (%) every frame cycle, the synthesis ratio A becomes "100" percent (%) at 10 frame cycles, and the transition processing ends. At the time the transition processing ends, the luminance signal synthesis unit 253 controls the switch 255 to select color image data from the color image signal processing unit 241. By executing this transition processing, an abrupt change in brightness in the output image data can be suppressed.

Then, when a synthesis start is instructed by the enable signal ENs3 after ending the synthesis, the luminance signal synthesis unit 253 executes transition processing for decreasing the synthesis ratio A every time the frame cycle passes. In addition, the luminance signal synthesis unit 253 controls the switch 255 to select the image data from the RGB conversion unit 254.

It should be noted that although the synthesis processing unit 250 synthesizes the monochrome image data and the color image data, a combination of the image data to be synthesized is not limited to the monochrome image data and the color image data. For example, the synthesis processing unit 250 may synthesize two pieces of color image data. In addition, although the synthesis processing unit 250 performs the synthesis while separating the luminance signal and the color difference signals, the synthesis may be performed without separating them.

Figure 7:
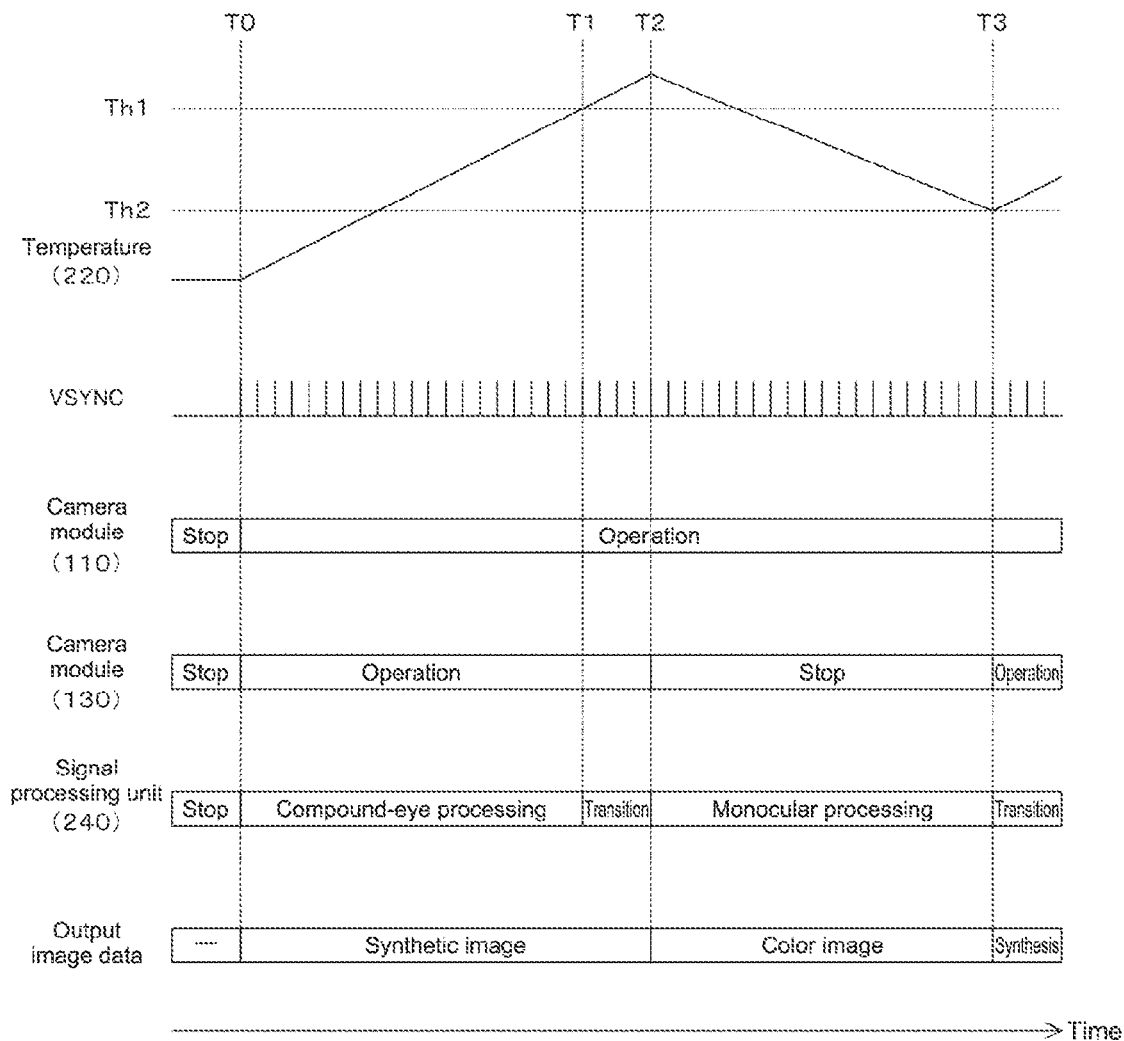

FIG. 7 is a timing chart showing an example of an operation of the image pickup apparatus 100 according to the first embodiment of the present technology. Before image pickup starts, all of the enable signals ENc1, ENc2, ENs1, ENs2, and ENs3 are set to, for example, disable.

When an application or the like for performing image pickup is executed at a timing T0, the control unit 210 sets all of the enable signals ENc1, ENc2, ENs1, ENs2, and ENs3 to enable. As a result, the camera modules 110 and 130 start operating. In addition, the signal processing unit 240 executes compound-eye processing and outputs synthetic image data.

Due to the operations of the camera modules 110 and 130 and an increase of a processing amount of the signal processing unit 240, power consumption and a heat generation amount of the image pickup apparatus 100 increase, and a temperature of the image pickup apparatus 100 gradually increases. Then, at a timing T1, the temperature becomes higher than an upper limit threshold value Th1. Here, in an electronic apparatus, in order to prevent breakage of circuits due to heat, a safety circuit for stopping operations of the circuits when a temperature of the apparatus becomes higher than a certain stop threshold value is incorporated in many cases. As the upper limit threshold value Th1, a value lower than such a stop threshold value is set.

At the timing T1, the control unit 210 sets the enable signal ENs3 to disable on the basis of a comparison result between the temperature and the upper limit threshold value Th1, to thus start a switch from the compound-eye processing to the monocular processing.

In accordance with the enable signal ENs3, the synthesis processing unit 250 executes the transition processing for gradually changing the synthesis ratio. This transition processing ends after a certain time passes. For example, in a case where the synthesis ratio A is incremented by "10" percent (%) every frame cycle, the synthesis ratio A becomes "100" percent (%) at 10 frame cycles, and the transition processing ends.

At a timing T2 where the transition processing ends, the control unit 210 stops the camera module 130 and the monochrome image signal processing unit 247 in accordance with the enable signal ENc2 and the enable signal ENs2. By stopping the monochrome image signal processing unit 247, the signal processing unit 240 starts the monocular processing and outputs color image data.

By stopping the camera module 130 and switching from the compound-eye processing to the monocular processing, the power consumption and heat generation amount of the image pickup apparatus 100 decrease, and the temperature of the image pickup apparatus 100 gradually decreases.

Then, when the temperature becomes lower than a lower limit threshold value Th2 at a timing T3, the control unit 210 sets the enable signals ENs2 and ENs3 to enable to start a switch from the monocular processing to the compound-eye processing.

The monochrome image signal processing unit 247 starts operating in accordance with the enable signal ENs2, and the synthesis processing unit 250 executes the transition processing for gradually changing the synthesis ratio in accordance with the enable signal ENs3.

It should be noted that although the signal processing unit 240 executes the transition processing first and then executes the processing to which the switch has been made (monocular processing or compound-eye processing) when a switch is instructed by the enable signal, it is also possible to execute those processing without executing the transition processing.

Figure 8:
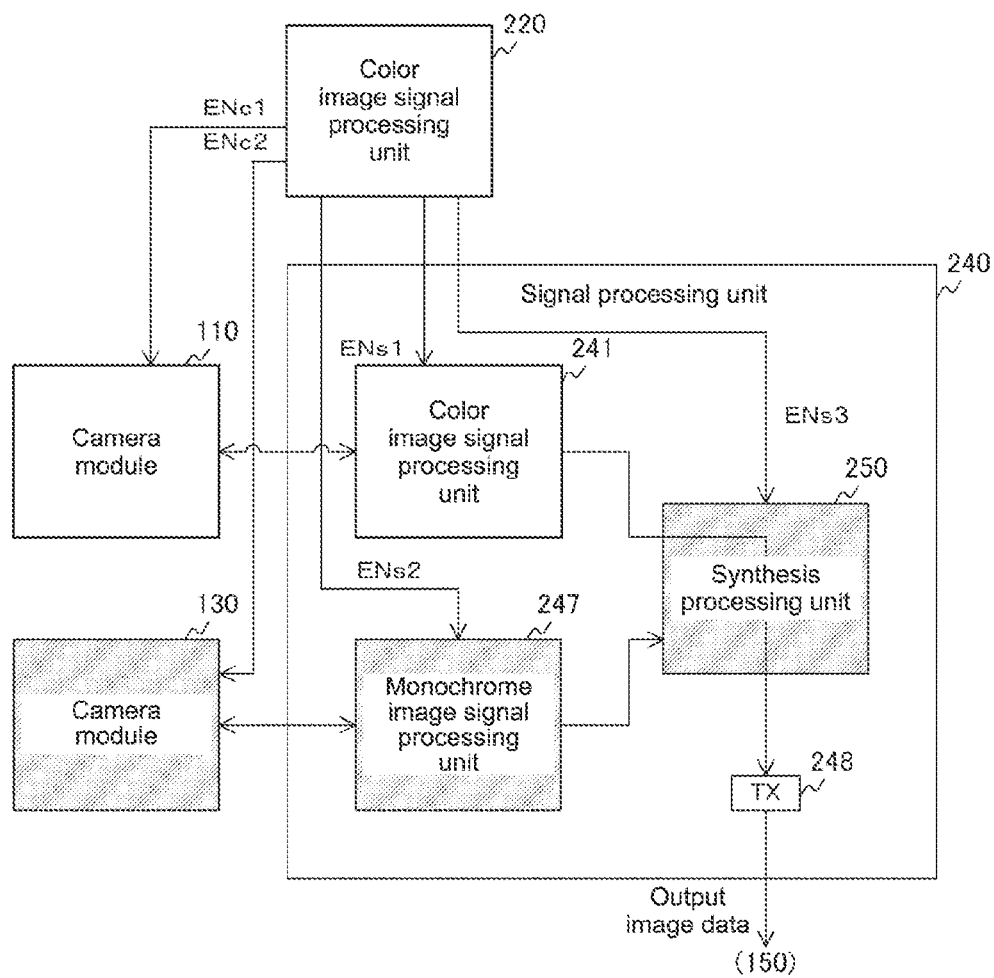

FIG. 8 is a block diagram showing an example of a state of the image pickup apparatus in a case where the synthesis processing according to the first embodiment of the present technology is not carried out. When the temperature becomes higher than the upper limit threshold value Th1, the control unit 210 disables the enable signals ENc2, ENs2, and ENs3. As a result, the camera module 130 and the monochrome image signal processing unit 247 stop operating, and the synthesis processing unit 250 stops the synthesis processing. Therefore, the power consumption and heat generation amount of the image pickup apparatus 100 are reduced.

For example, when the temperature of the image pickup apparatus 100 rises to exceed the stop threshold value during recording, there is a possibility that a part of the circuits will automatically stop for protection of the circuits of the image pickup apparatus 100 and for the safety of a user, and the recording will thus be interrupted. However, when the temperature becomes higher than the upper limit threshold value Th1 which is lower than that stop threshold value, the image pickup apparatus 100 switches from the compound-eye processing to the monocular processing to reduce the power consumption and heat generation amount. Therefore, the temperature rise is suppressed, and the recording can be continued.

"Operational Example of Image Pickup Apparatus"

Figure 9:
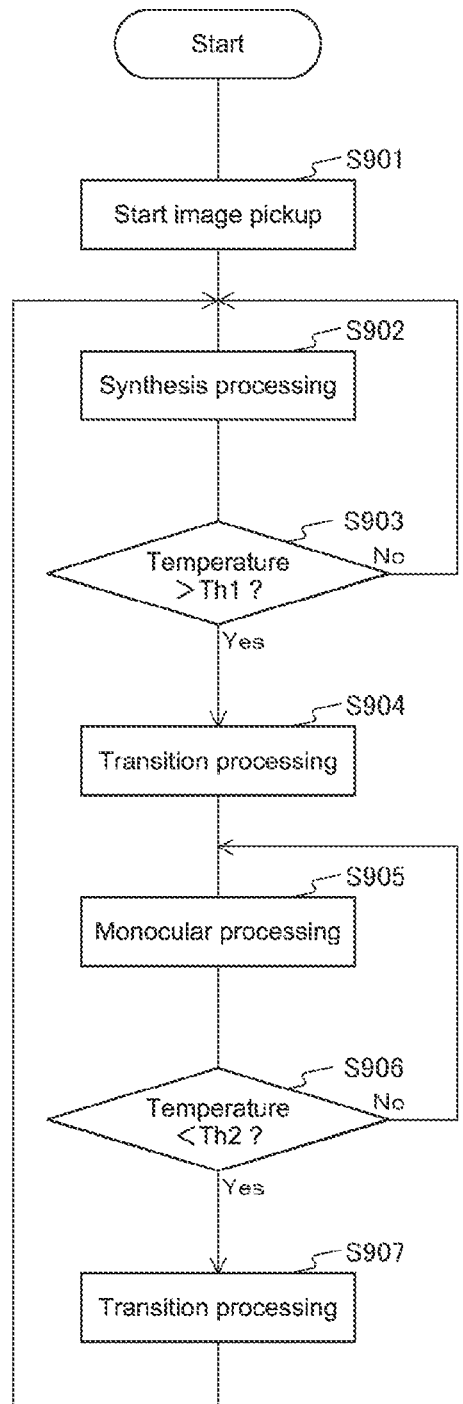

FIG. 9 is a flowchart showing an example of an operation of the image pickup apparatus 100 according to the first embodiment of the present technology. This operation is started when an application of the processing for performing image pickup is executed, for example.

The image pickup apparatus 100 starts capturing color image data and monochrome image data (Step S901). Then, the image pickup apparatus 100 carries out the synthesis processing for synthesizing the color image data and the monochrome image data (Step S902).

The image pickup apparatus 100 determines whether or not the temperature is higher than the upper limit threshold value Th1 (Step S903). In a case where the temperature is equal to or lower than the upper limit threshold value Th1 (Step S903: No), the image pickup apparatus 100 executes Step S902 and the subsequent steps again.

On the other hand, in a case where the temperature is higher than the upper limit threshold value Th1 (Step S903: Yes), the image pickup apparatus 100 executes the transition processing (Step S904) and executes the monocular processing (Step S905).

Then, the image pickup apparatus 100 determines whether or not the temperature is lower than the lower limit threshold value Th2 (Step S906). In a case where the temperature is equal to or higher than the lower limit threshold value Th2 (Step S906: No), the image pickup apparatus 100 executes Step S905 and the subsequent steps again.

On the other hand, in a case where the temperature is lower than the lower limit threshold value Th2 (Step S906: Yes), the image pickup apparatus 100 executes the transition processing (Step S907) and repetitively executes Step S902 and the subsequent steps.

In this way, in the first embodiment of the present technology, when the temperature becomes higher than the upper limit threshold value Th1, the control unit 210 controls the signal processing unit 240 to switch from the compound-eye processing to the monocular processing, so it becomes possible to reduce the processing amount of the signal processing unit 240 and reduce power consumption thereof. For various different examples of physical amounts, the physical amount can be determined according to a voltage value that varies in correspondence with the physical amount. For example, a temperature sensor may output a voltage value that varies in accordance with the sensed temperature, a voltage value may vary in accordance with changes in a remaining amount of battery capacity, etc.

First Modified Example

In the first embodiment described above, when the temperature becomes higher than the upper limit threshold value Th1, the control unit 210 causes the compound-eye processing to be switched to the monocular processing to thus reduce power consumption. However, by the method of switching in accordance with a temperature rise, power consumption may not be sufficiently reduced. For example, in a case where an outside temperature of the image pickup apparatus 100 is extremely low, the image pickup apparatus 100 is cooled by outside air so that the temperature becomes equal to or lower than the threshold value, and thus the switch to the monocular processing may not be executed. The control unit 210 according to a first modified example of the first embodiment is different from that of the first embodiment in that a switch from the compound-eye processing to the monocular processing is performed in accordance with a physical amount other than the temperature.

Figure 10:
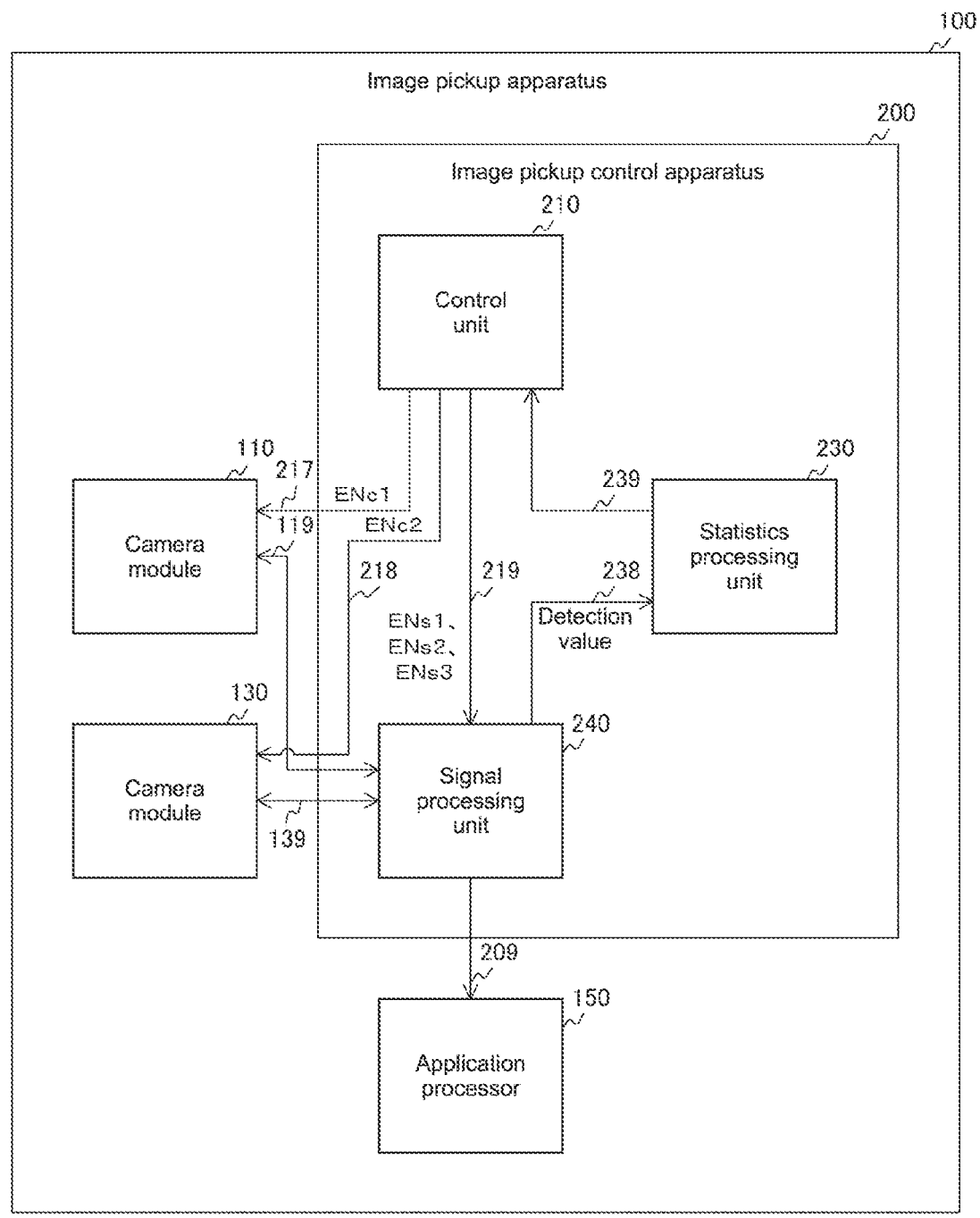

FIG. 10 is a block diagram showing a configuration example of the image pickup apparatus 100 according to the first modified example of the first embodiment of the present technology. This image pickup apparatus 100 according to the first modified example of the first embodiment is different from that of the first embodiment in that a statistics processing unit 230 is provided in place of the temperature sensor 220.

The statistics processing unit 230 obtains a statistical amount (average value, total value, etc.) of detection values from the signal processing unit 240. The signal processing unit 240 supplies a detection value of the color image data and a detection value of the monochrome image data to the statistics processing unit 230 via a signal line 238. Then, the statistics processing unit 230 obtains a statistical amount of those detection values and supplies it to the control unit 210 via a signal line 239.

The control unit 210 compares the statistical amount from the statistics processing unit 230 with a threshold value and makes a switch between the monocular processing and the compound-eye processing on the basis of the comparison result. This statistical amount indicates a photometric amount obtained from the two pieces of image data. For example, when the statistical amount (photometric amount) becomes larger than an upper limit threshold value, the control unit 210 causes the compound-eye processing to be switched to the monocular processing. Accordingly, in a case where the image pickup environment is bright, there is no need to improve luminance by the synthesis, so the monocular processing is executed, and power consumption is reduced. On the other hand, in a case where the photometric amount becomes smaller than a lower limit threshold value, the control unit 210 causes the monocular processing to be switched to the compound-eye processing.

Figure 11:
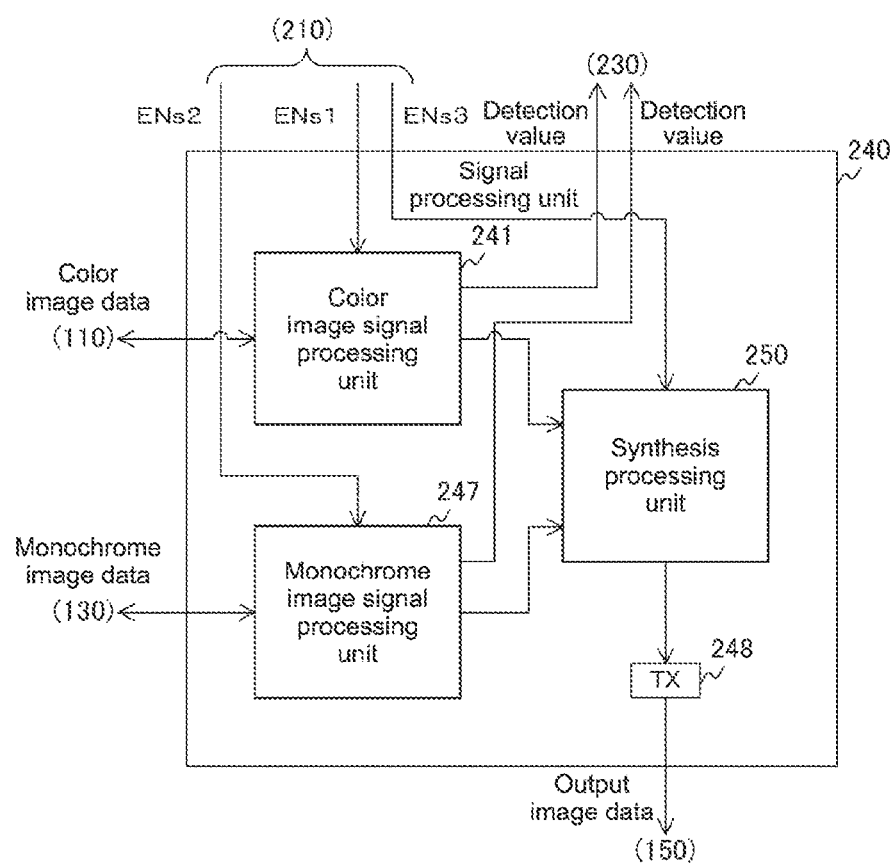

FIG. 11 is a block diagram showing a configuration example of the signal processing unit 240 according to the first modified example of the first embodiment of the present technology. In this first modified example of the first embodiment, the color image signal processing unit 241 and the monochrome image signal processing unit 247 supply detection values to the statistics processing unit 230.

As described above, in the first modified example of the first embodiment of the present technology, when the photometric amount becomes larger than the threshold value, the control unit 210 causes the compound-eye processing to be switched to the monocular processing, so it becomes possible to reduce the processing amount of the signal processing unit 240 in accordance with the photometric amount and reduce power consumption thereof.

Second Modified Example

In the first modified example of the first embodiment described above, when the photometric amount becomes larger than the threshold value, the control unit 210 makes a switch from the compound-eye processing to the monocular processing to thus reduce power consumption. However, by the method of switching in accordance with the photometric amount, there is a possibility that the power consumption will not be sufficiently reduced. For example, in a case where the image pickup environment of the image pickup apparatus 100 is dark, the photometric amount may become smaller than the threshold value, and a switch to the monocular processing may not be executed. The control unit 210 according to this second modified example of the first embodiment is different from that of the first modified example of the first embodiment in that the switch from the compound-eye processing to the monocular processing is performed in accordance with a physical amount other than the photometric amount.

Figure 12:
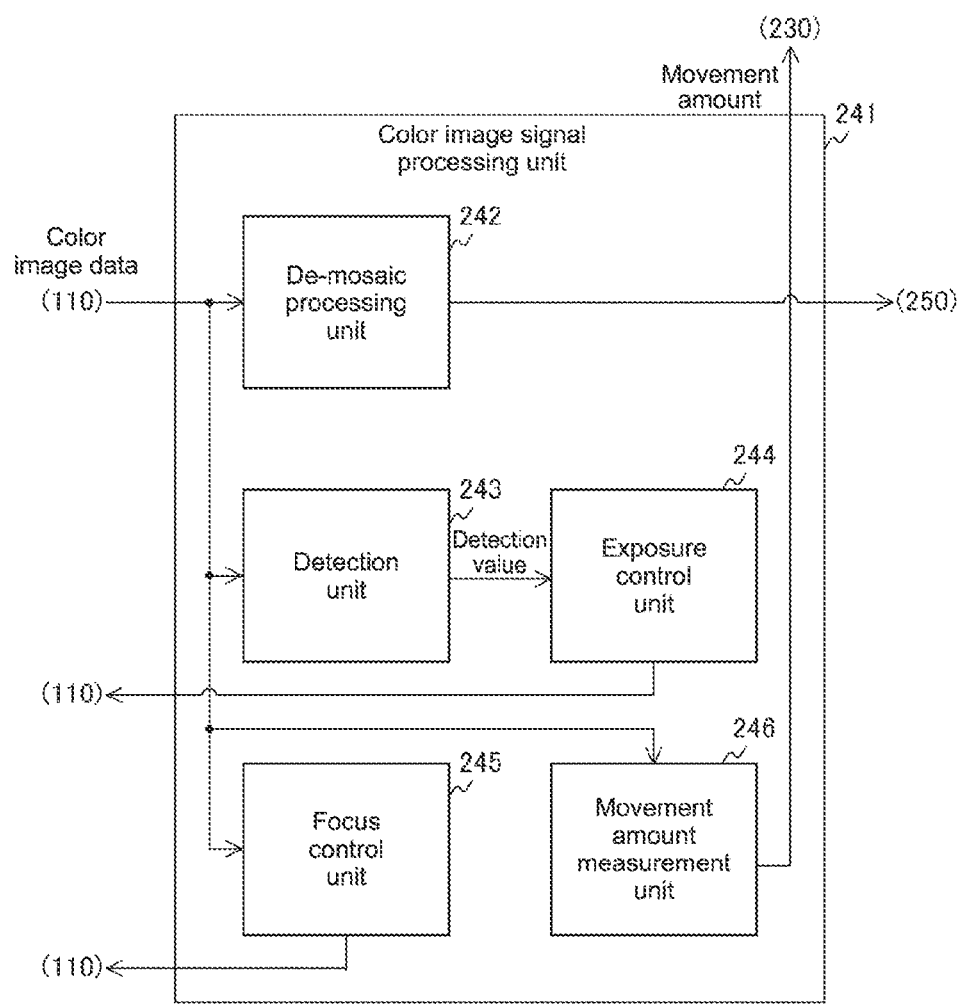

FIG. 12 is a block diagram showing a configuration example of the color image signal processing unit 241 according to the second modified example of the first embodiment of the present technology. This color image signal processing unit 241 according to the second modified example of the first embodiment is different from that of the first modified example of the first embodiment in that it further includes a movement amount measurement unit 246.

The movement amount measurement unit 246 measures a movement amount of a subject on the basis of a plurality of pieces of color image data captured in time series. This movement amount measurement unit 246 temporarily stores a predetermined number of pieces of color image data, for example, and detects a moving object using an inter-frame difference method, a background difference method, or the like. Then, the movement amount measurement unit 246 calculates, as the movement amount, a length of a vector from a representative position (center of gravity, etc.) of a moving body detected in one of the two pieces of color image data captured at different timings to a representative position of the moving body detected in the other one of the two pieces of color image data. The movement amount measurement unit 246 supplies the measured movement amount to the statistics processing unit 230.

Also, the monochrome image signal processing unit 247 measures a movement amount and supplies it to the statistics processing unit 230. The statistics processing unit 230 obtains a statistical amount (average value etc.) of the movement amount and supplies it to the control unit 210.

For example, when the statistical amount is equal to or larger than a threshold value, the control unit 210 causes the monocular processing to be switched to the compound-eye processing. On the other hand, when the statistical amount becomes smaller than the threshold value, the control unit 210 causes the compound-eye processing to be switched to the monocular processing. Accordingly, in a case where there is no movement of the subject, the synthesis processing for improving luminance can be stopped, and thus the power consumption can be reduced.

It should be noted that although the image pickup apparatus 100 makes a switch between the compound-eye processing and the monocular processing on the basis of a comparison result between the movement amount and the threshold value, it is also possible to make a switch on the basis of a comparison result between a remaining battery amount and a threshold value. In this case, a remaining battery amount measurement unit that measures a remaining battery amount only needs to be added so that the control unit 210 controls the signal processing unit 240 to switch from the compound-eye processing to the monocular processing when the remaining battery amount becomes smaller than the threshold value, for example.

In this way, in the second modified example of the first embodiment of the present technology, when the movement amount becomes smaller than the threshold value, the control unit 210 causes the compound-eye processing to be switched to the monocular processing, so it becomes possible to reduce the processing amount of the signal processing unit 240 in accordance with the movement amount, and thus power consumption thereof can be reduced.

2. Second Embodiment

In the first embodiment described above, when the temperature becomes higher than the upper limit threshold value Th1, the control unit 210 makes a switch from the compound-eye processing to the monocular processing to reduce power consumption. However, since the synthesis processing for improving luminance is stopped when switched to the monocular processing, there is a possibility that image quality of image data will be lowered due to insufficient brightness. The image pickup apparatus 100 according to the second embodiment is different from that of the first embodiment in that power consumption of an interface is reduced while executing synthesis processing at a time the temperature becomes higher than the upper limit threshold value Th1.

Figure 13:
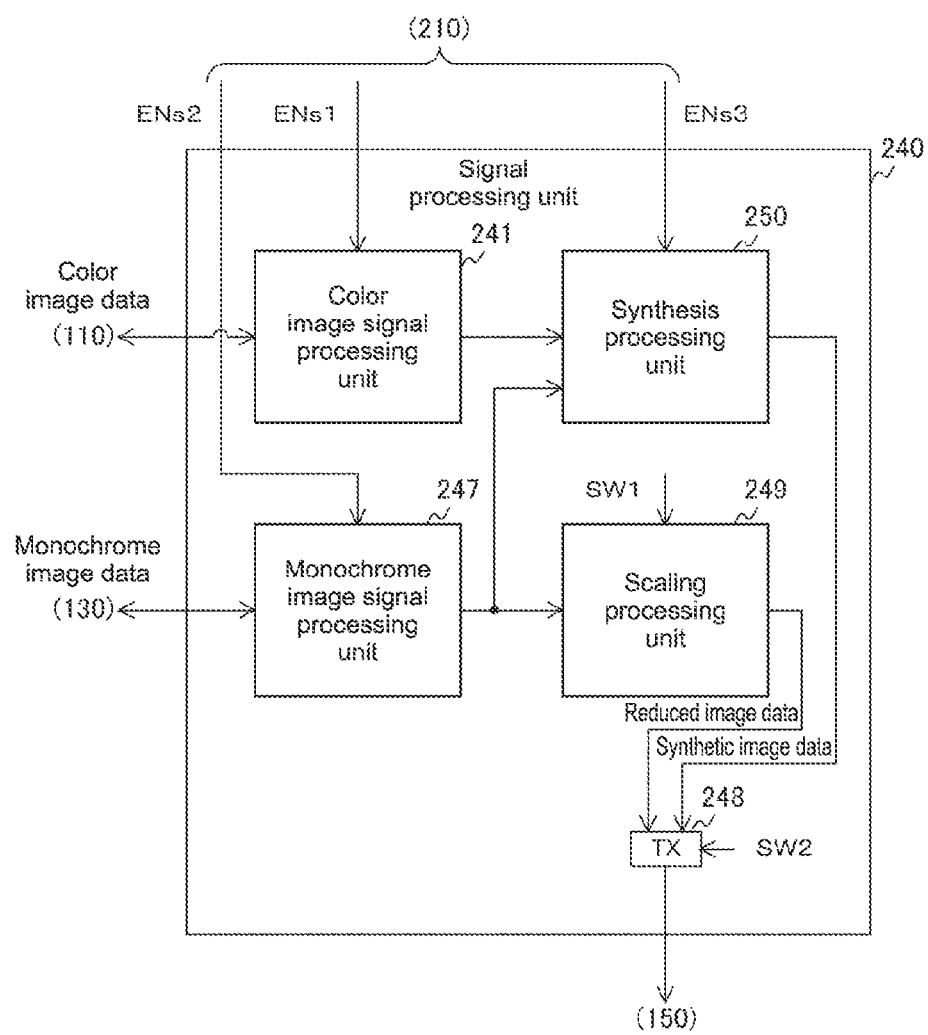

FIG. 13 is a block diagram showing a configuration example of the signal processing unit 240 according to the second embodiment of the present technology. This signal processing unit 240 according to the second embodiment is different from that of the first embodiment in that it further includes a scaling processing unit 249.

The scaling processing unit 249 reduces an image size of monochrome image data that has been subjected to signal processing by a predetermined reduction ratio. Here, a reduction ratio R is expressed by the following expression, for example.

$$R = (\text{image size after reduction})/(\text{image size before reduction})$$

This scaling processing unit 249 supplies image data obtained after the reduction to the transmission unit 248 as reduced image data. Further, a switch signal SW1 from the control unit 210 is input to the scaling processing unit 249. This switch signal SW1 is a signal that instructs a switch from one of an initial value and a target value regarding the reduction ratio to the other one of the values. Further, as the target value, a value that is smaller than the initial value and with which reduced image data can be superimposed on synthetic image data to be transmitted by 1 channel is set. It should be noted that the initial value may be "1" that is a value at which reduction is not executed.

Further, a switch signal SW2 from the control unit 210 is input to the transmission unit 248 of the second embodiment. This switch signal SW2 is a signal that instructs a switch from one of 1 channel and 2 channels to the other one of the 1 channel and the 2 channels regarding the number of communication channels used for transmitting image data. Here, as the communication channel, for example, a virtual channel conforming to an MIPI standard is used. In a case of transmitting by 1 channel, the transmission unit 248 superimposes reduced image data on synthetic image data and transmits it.

The control unit 210 of the second embodiment sets the enable signals ENs1 to ENs3 to enable at a time of starting image pickup and causes the scaling processing unit 249 to perform reduction by an initial value reduction ratio by the switch signal SW1. Further, the control unit 210 sets the communication channel to be 2 channels by the switch signal SW2 and causes the synthetic image data and the reduced image data to be transmitted. These pieces of image data are transmitted via mutually different communication channels.

Then, when the temperature becomes higher than the upper limit threshold value Th1, the control unit 210 instructs the scaling processing unit 249 to switch from the initial value to the target value regarding the reduction ratio by the switch signal SW1. The scaling processing unit 249 executes transition processing for decreasing the reduction ratio to the target value stepwise for each frame cycle. Further, the control unit 210 causes the number of communication channels to be switched from 2 channels to 1 channel by the switch signal SW2. Meanwhile, in the second embodiment, even if the temperature rises, the synthesis processing is continuously executed.

Then, when the temperature becomes lower than the lower limit threshold value Th2, the control unit 210 instructs the scaling processing unit 249 to switch the reduction ratio to the initial value by the switch signal SW1. The scaling processing unit 249 executes transition processing for increasing the reduction ratio to the initial value stepwise for each frame cycle. Further, the control unit 210 causes the number of communication channels to be switched from 1 channel to 2 channels by the switch signal SW2.

Figure 14:
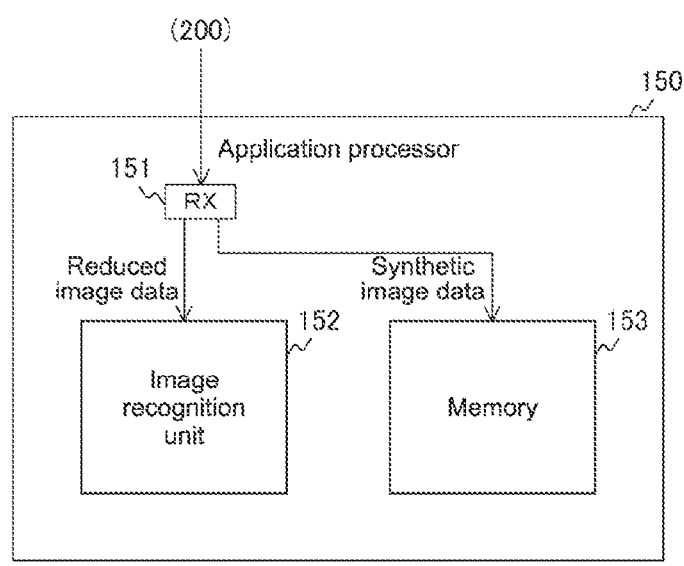

FIG. 14 is a block diagram showing a configuration example of the application processor 150 according to the second embodiment of the present technology. This application processor 150 includes a reception unit 151, an image recognition unit 152, and a memory 153.

The reception unit 151 receives image data from the image pickup control apparatus 200. This reception unit 151 receives the reduced image data and the synthetic image data via a communication channel of 1 channel or 2 channels. Then, the reception unit 151 supplies the reduced image data to the image recognition unit 152 and causes the memory 153 to store the synthetic image data.

The image recognition unit 152 executes image recognition processing such as face recognition and object recognition on the reduced image data. The recognition result is used to judge whether or not to store (i.e., record) the synthetic image data in a nonvolatile memory, for example.

The memory 153 stores the synthetic image data. A DRAM (Dynamic RAM) is used as the memory 153, for example. The synthetic image data stored in the memory 153 is supplied to a display apparatus or the nonvolatile memory, for example.

As described above, by reducing the number of communication channels, power consumption of the interface including the transmission unit 248 and the reception unit 151 can be reduced.

It should be noted that although the image pickup apparatus 100 switches the number of communication channels on the basis of a comparison result between the temperature and the threshold value, it is also possible to make a switch on the basis of a comparison result between a physical amount other than the temperature and a threshold value. For example, the image pickup apparatus 100 can use physical amounts such as a photometric amount, a movement amount of a subject, and a remaining battery amount for determining a switch.

As described above, in the second embodiment of the present technology, when the temperature becomes higher than the upper limit threshold value Th1, the control unit 210 reduces the number of communication channels, so the power consumption of the interface can be reduced.

Modified Example

In the second embodiment described above, when the temperature becomes higher than the upper limit threshold value Th1, the control unit 210 changes the reduction ratio to a small value with which image data can be transmitted even when the number of communication channels is reduced. However, if the reduction ratio becomes small, an image size of the reduced image data becomes small, and recognition accuracy in the image recognition is lowered. The image pickup apparatus 100 according to a modified example of the second embodiment is different from that of the first embodiment in that, when the temperature becomes higher than the upper limit threshold value Th1, a frame rate is lowered without changing the reduction ratio.

Figure 15:
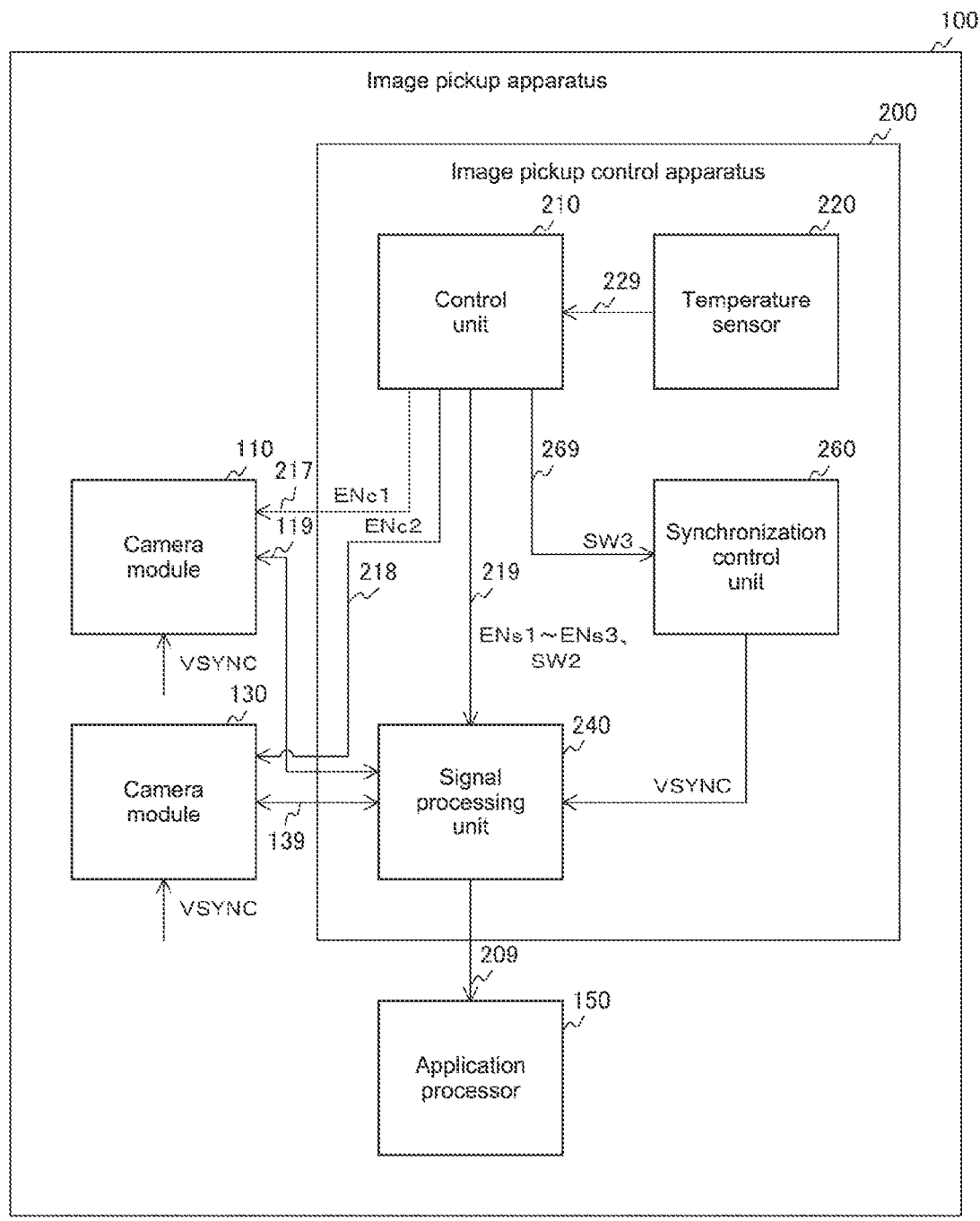

FIG. 15 is a block diagram showing a configuration example of the image pickup apparatus 100 according to the modified example of the second embodiment of the present technology. This image pickup apparatus 100 according to the modified example of the second embodiment is different from that of the second embodiment in that a synchronization control unit 260 is additionally provided in the image pickup control apparatus 200.

The synchronization control unit 260 supplies the vertical synchronization signal VSYNC to the camera modules 110 and 130 and the signal processing unit 240. A switch signal SW3 from the control unit 210 is input to this synchronization control unit 260 via a signal line 269. This switch signal SW3 is a signal that instructs a switch from one of an initial value and a target value regarding a frequency (i.e., frame rate) of the vertical synchronization signal VSYNC to the other one of the values. As the target value, a value that is lower than the initial value and with which reduced image data can be superimposed on synthetic image data to be transmitted by 1 channel is set.

In addition, the switch signal SW1 for switching the reduction ratio is not input to the signal processing unit 240 according to the modified example of the second embodiment.

When the temperature becomes higher than the upper limit threshold value Th1, the control unit 210 instructs a switch of the frame rate from the initial value to the target value by the switch signal SW3. Then, when the temperature becomes lower than the lower limit threshold value Th2, the control unit 210 instructs a switch of the frame rate to the initial value by the switch signal SW3. Meanwhile, in the modified example of the second embodiment, the reduction ratio is not changed.

In this way, in the modified example of the second embodiment of the present technology, when the temperature becomes higher than the upper limit threshold value Th1, the control unit 210 reduces the number of communication channels to reduce the frame rate, so it becomes possible to reduce the power consumption of the interface without changing the reduction ratio.

3. Application Example to Mobile Body

The technology according to the present disclosure (present technology) is applicable to various products. For example, the technology according to the present disclosure may be realized as an apparatus mounted on any type of moving bodies, such as an automobile, an electric vehicle, a hybrid electric vehicle, a motorcycle, a bicycle, a personal mobility, an airplane, a drone, a ship, and a robot.

Figure 16:
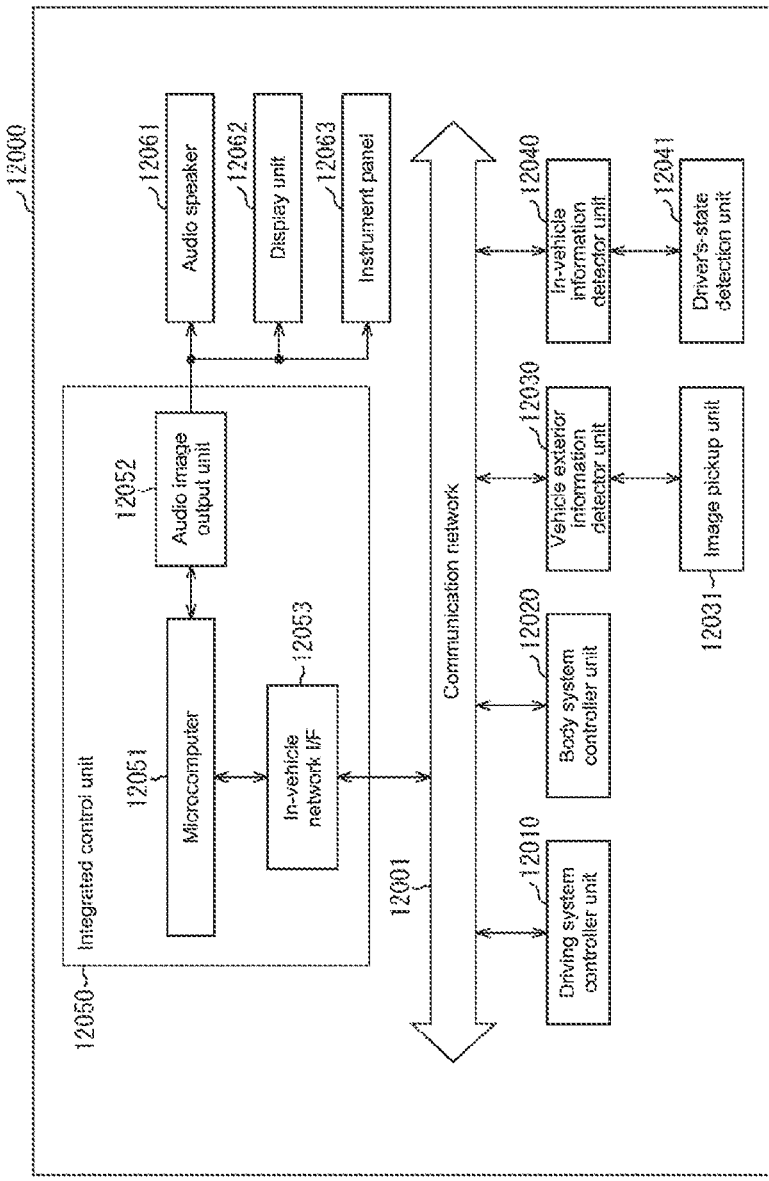

FIG. 16 is a block diagram showing a schematic configuration example of a vehicle control system as an example of a mobile body control system to which the technology according to the present disclosure is applicable.

A vehicle control system. 12000 includes a plurality of electronic control units connected via a communication network 12001. In the example shown in FIG. 16, the vehicle control system 12000 includes a driving system controller unit 12010, a body system controller unit 12020, a vehicle exterior information detector unit 12030, an in-vehicle information detector unit 12040, and an integrated controller unit 12050. Further, as a functional configuration of the integrated controller unit 12050, a microcomputer 12051, an audio image output unit 12052, and an in-vehicle network I/F (interface) 12053 are illustrated.

The driving system controller unit 12010 controls an operation of an apparatus related to a driving system of a vehicle in accordance with various programs. For example, the driving system controller unit 12010 functions as a control apparatus for a driving force generation apparatus for generating a driving force of the vehicle, such as an internal combustion engine and a driving motor, a driving force transmission mechanism for transmitting a driving force to the wheels, a steering mechanism that adjusts a rudder angle of the vehicle, a braking apparatus for generating a braking force of the vehicle, and the like.

The body system controller unit 12020 controls operations of various apparatuses equipped in a vehicle body in accordance with various programs. For example, the body system controller unit 12020 functions as a control apparatus for a keyless entry system, a smart key system, a power window apparatus, and various lamps such as headlamps, backing light, brake light, turn indicators, and fog lamps. In this case, radio waves transmitted from a mobile device that substitutes for a key or signals of various switches can be input to the body system controller unit 12020. The body system controller unit 12020 receives an input of these radio waves or signals and controls a door lock apparatus, the power window apparatus, the lamps, and the like of the vehicle.

The vehicle exterior information detector unit 12030 detects external information of the vehicle on which the vehicle control system 12000 is mounted. For example, an image pickup unit 12031 is connected to the vehicle exterior information detector unit 12030. The vehicle exterior information detector unit 12030 causes the image pickup unit 12031 to capture an image outside the vehicle and receives the captured image. The vehicle exterior information detector unit 12030 may carry out object detection processing or distance detection processing with respect to a person, a car, an obstacle, a sign, characters on a road surface, and the like on the basis of the received image.

The image pickup unit 12031 is a light sensor that receives light and outputs an electric signal corresponding to a light reception amount of that light. The image pickup unit 12031 is capable of outputting an electric signal as an image or outputting it as distance measurement information. Moreover, the light received by the image pickup unit 12031 may either be visible light or invisible light such as infrared light.

The in-vehicle information detector unit 12040 detects information inside the vehicle. A driver's-state detection unit 12041 that detects a state of a driver is connected to the in-vehicle information detector unit 12040, for example. The driver's-state detection unit 12041 includes, for example, a camera that captures the driver, and the in-vehicle information detector unit 12040 may calculate a degree of fatigue or a degree of concentration of the driver or determine whether or not the driver is dozing off on the basis of detection information input from the driver's-state detection unit 12041.

The microcomputer 12051 is capable of calculating a control target value of the driving force generation apparatus, the steering mechanism, or the braking apparatus on the basis of exterior information or in-vehicle information acquired by the vehicle exterior information detector unit 12030 or the in-vehicle information detector unit 12040, and outputting a control command to the driving system controller unit 12010. For example, the microcomputer 12051 is capable of performing cooperative control that aims at realizing a function of ADAS (Advanced Driver Assistance System) that includes collision avoidance or impact mitigation of a vehicle, follow-up running based on a distance between vehicles, running while maintaining a vehicle speed, vehicle collision warning, vehicle lane deviation warning, and the like.

Further, the microcomputer 12051 controls the driving force generation apparatus, the steering mechanism, the braking apparatus, or the like on the basis of peripheral information of the vehicle acquired by the vehicle exterior information detector unit 12030 or the in-vehicle information detector unit 12040, so as to be capable of performing cooperative control that aims at realizing automatic driving that allows a vehicle to run autonomously without depending on an operation of the driver, and the like.

Furthermore, the microcomputer 12051 is capable of outputting a control command to the body system controller unit 12020 on the basis of the vehicle exterior information acquired by the vehicle exterior information detector unit 12030. For example, the microcomputer 12051 is capable of controlling the headlamps in accordance with a position of a preceding vehicle or an oncoming vehicle that has been detected by the vehicle exterior information detector unit 12030, and performing cooperative control that aims at realizing antiglare by switching a high beam to a low beam, or the like.

The audio image output unit 12052 transmits an output signal of at least one of audio and an image to an output apparatus capable of visually or audibly notifying a passenger of the vehicle or outside the vehicle, of information. In the example shown in FIG. 16, an audio speaker 12061, a display unit 12062, and an instrument panel 12063 are exemplified as the output apparatus. The display unit 12062 may include at least one of an on-board display and a head-up display, for example.

Figure 17:
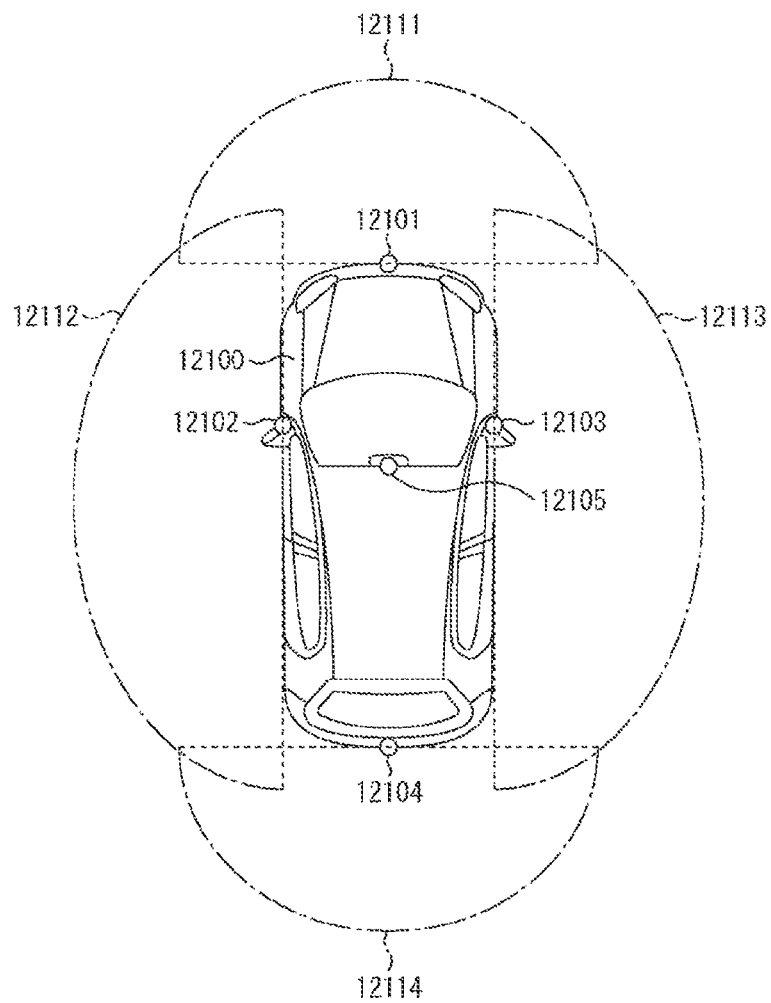

FIG. 17 is a diagram showing an example of a setting position of the image pickup unit 12031.

In FIG. 17, image pickup units 12101, 12102, 12103, 12104, and 12105 are included as the image pickup unit 12031.

For example, the image pickup units 12101, 12102, 12103, 12104, and 12105 are provided at positions corresponding to a front nose, side mirrors, rear bumper, back door, upper portion of a front window in a cabin, and the like of a vehicle 12100. The image pickup unit 12101 provided at the front nose and the image pickup unit 12105 provided at the upper portion of the front window in the cabin mainly acquire an image in front of the vehicle 12100. The image pickup units 12102 and 12103 provided at the side mirrors mainly acquire images of sides of the vehicle 12100. The image pickup unit 12104 provided at the rear bumper or the back door mainly acquires an image behind the vehicle 12100. The image pickup unit 12105 provided at the upper portion of the front window in the cabin is mainly used for detecting preceding vehicles, pedestrians, obstacles, traffic signals, traffic signs, lanes, and the like.

It should be noted that FIG. 17 shows an example of image pickup ranges of the image pickup units 12101 to 12104. An image pickup range 12111 indicates an image pickup range of the image pickup unit 12101 provided at the front nose, image pickup ranges 12112 and 12113 indicate image pickup ranges of the image pickup units 12102 and 12103 respectively provided at the side mirrors, and an image pickup range 12114 indicates an image pickup range of the image pickup unit 12104 provided at the rear bumper or the back door. For example, by causing image data captured by the image pickup units 12101 to 12104 to overlap one another, an overhead view image of the vehicle 12100 viewed from above can be obtained.

At least one of the image pickup units 12101 to 12104 may include a function of acquiring distance information. For example, at least one of the image pickup units 12101 to 12104 may be a stereo camera including a plurality of image pickup devices, or may be an image pickup device including pixels for a phase difference detection.

For example, the microcomputer 12051 can calculate a distance to each three-dimensional object within the image pickup ranges 12111 to 12114 and a temporal change (relative speed with respect to vehicle 12100) of the distances on the basis of distance information obtained from the image pickup units 12101 to 12104, to thus extract a three-dimensional object that is closest to the vehicle 12100 on a traveling path and is traveling at a predetermined speed (e.g., 0 km/h or more) in substantially the same direction as the vehicle 12100 in particular, as a preceding vehicle. Furthermore, the microcomputer 12051 can set an inter-vehicle distance to be secured in advance behind the preceding vehicle so as to perform automatic brake control (including follow-up stop control), automatic acceleration control (including follow-up start control), and the like. In this way, it is possible to perform cooperative control that aims at realizing automatic driving in which the vehicle runs autonomously without depending on an operation of the driver, and the like.

For example, on the basis of the distance information obtained from the image pickup units 12101 to 12104, the microcomputer 12051 can extract three-dimensional object data related to the three-dimensional object while categorizing it as a two-wheeled vehicle, a standard-sized vehicle, a large-sized vehicle, a pedestrian, or other three-dimensional objects such as a utility pole, and use it for automatic avoidance of obstacles. For example, the microcomputer 12051 identifies an obstacle in a periphery of the vehicle 12100 as an obstacle visible by the driver of the vehicle 12100 or an obstacle that is difficult to be seen. Then, the microcomputer 12051 determines a collision risk that indicates a degree of risk of a collision with each obstacle, and when the collision risk is equal to or larger than a setting value and thus there is a possibility of a collision, a warning is output to the driver via the audio speaker 12061 or the display unit 12062, or forced deceleration or avoidance steering is performed via the driving system controller unit 12010, so that driving assistance for avoiding a collision can be performed.

At least one of the image pickup units 12101 to 12104 may be an infrared camera that detects infrared rays. For example, the microcomputer 12051 can recognize a pedestrian by judging whether or not there is a pedestrian in images captured by the image pickup units 12101 to 12104. Such a recognition of a pedestrian is carried out by, for example, a procedure of extracting feature points in images captured by the image pickup units 12101 to 12104 as the infrared camera and a procedure of carrying out pattern matching processing on a series of feature points indicating an outline of an object to judge whether or not there is a pedestrian. When the microcomputer 12051 judges that a pedestrian exists in the captured images of the image pickup units 12101 to 12104 and recognizes a pedestrian, the audio image output unit 12052 controls the display unit 12062 to superimpose a rectangular outline for emphasis on the recognized pedestrian during display. Alternatively, the audio image output unit 12052 may control the display unit 12062 to display an icon or the like indicating a pedestrian at a desired position.

Heretofore, an example of the vehicle control system to which the technology according to the present disclosure is applicable has been described. The technology according to the present disclosure is applicable to the image pickup unit 12031 out of the configuration described above. Specifically, the image pickup apparatus 100 shown in FIG. 1 is applicable to the image pickup unit 12031 shown in FIG. 16. By applying the technology according to the present disclosure to the image pickup unit 12031, power consumption of the image pickup unit 12031 can be reduced, and thus consumption of an on-board battery can be suppressed.

It should be noted that the embodiments described above are examples for embodying the present technology, and the matters in the embodiments and the specific matters of the invention in the scope of claims respectively have correspondence relationships. Similarly, the specific matters of the invention in the scope of claims and the matters in the embodiments of the present technology having the same names as the specific matters of the invention in the scope of claims respectively have correspondence relationships. However, the present technology is not limited to the embodiments described above and can be embodied by being variously modified without departing from the gist of the present technology.

Further, the processing procedures described in the embodiments described above may be regarded as a method including the series of procedures, or may be regarded as a program for causing a computer to execute the series of procedures or a recording medium that stores such a program. Examples of this recording medium include a CD (Compact Disc), an MD (Mini Disc), a DVD (Digital Versatile Disc), a memory card, a Blu-ray (registered trademark) disc, and the like.

It should be noted that the effects described in the specification are mere examples and should not be limited thereto, and other effects may also be obtained.

It should be noted that the present technology can also take the following configurations.

(1) An image pickup control apparatus, including:
 a signal processing unit that executes, in accordance with a predetermined control signal, either compound-eye processing for synthesizing a plurality of pieces of image data by carrying out signal processing on each of the plurality of pieces of image data or monocular processing for carrying out the signal processing on any one of the plurality of pieces of image data; and
 a control unit that supplies the predetermined control signal to the signal processing unit and causes one of the compound-eye processing and the monocular processing to be switched to the other one of the compound-eye processing and the monocular processing, on a basis of a result of a comparison between a measured predetermined physical amount and a predetermined threshold value.

(2) The image pickup control apparatus according to (1), in which
 the predetermined physical amount is a physical amount that fluctuates in accordance with an image pickup environment.

(3) The image pickup control apparatus according to (2), further including
 a temperature sensor that measures a temperature as the predetermined physical amount,
 in which
 the control unit causes the compound-eye processing to be switched to the monocular processing in a case where the temperature is higher than the predetermined threshold value.

(4) The image pickup control apparatus according to (2), in which
 the signal processing unit includes processing of measuring a light amount of incident light as the predetermined physical amount and acquiring the light amount as a photometric amount, and
 the control unit causes the compound-eye processing to be switched to the monocular processing in a case where the photometric amount is larger than the predetermined threshold value.

(5) The image pickup control apparatus according to (1), in which
 the signal processing unit includes processing of measuring a movement amount of a subject as the predetermined physical amount, and
 the control unit causes the monocular processing to be switched to the compound-eye processing in a case where the movement amount is larger than the predetermined threshold value.

(6) The image pickup control apparatus according to any one of (1) to (5), in which
 the plurality of pieces of image data are images captured in synchronization with predetermined synchronization signals, and
 the signal processing unit switches one of the compound-eye processing and the monocular processing to the other one of the compound-eye processing and the monocular processing after executing transition processing for performing a synthesis while changing a synthesis ratio every time a predetermined cycle passes.

(7) An image pickup control apparatus, including:
a synthesis processing unit that synthesizes a plurality of pieces of image data and outputs the data as synthetic image data;
a transmission unit that executes, in accordance with a predetermined control signal, either single-channel transmission processing for transmitting the synthetic image data together with a single piece of image data as any one of the plurality of pieces of image data via a single communication channel or multiple-channel transmission processing for respectively transmitting the single piece of image data and the synthetic image data via mutually different communication channels; and
a control unit that supplies the predetermined control signal to the signal processing unit and causes one of the single-channel transmission processing and the multiple-channel transmission processing to be switched to the other one of the single-channel transmission processing and the multiple-channel transmission processing, on a basis of a result of a comparison between a measured predetermined physical amount and a predetermined threshold value.

(8) The image pickup apparatus according to (7), further including
a scaling processing unit that reduces any one of the plurality of pieces of image data,
in which
the control unit controls the scaling processing unit to change a reduction ratio on the basis of the result of the comparison between the predetermined physical amount and the predetermined threshold value.

(9) The image pickup apparatus according to (7), further including
a synchronization control unit that supplies a predetermined synchronization signal,
in which
each of the plurality of pieces of image data is image data that has been captured in synchronization with the predetermined synchronization signal, and
the control unit controls the synchronization control unit to change a frequency of the predetermined synchronization signal on the basis of the result of the comparison between the predetermined physical amount and the predetermined threshold value.

(10) An image pickup apparatus, including:
a camera module that captures a plurality of pieces of image data;
a signal processing unit that executes, in accordance with a predetermined control signal, either compound-eye processing for synthesizing the plurality of pieces of image data by carrying out signal processing on each of the plurality of pieces of image data or monocular processing for carrying out the signal processing on any one of the plurality of pieces of image data; and
a control unit that supplies the predetermined control signal to the signal processing unit and causes one of the compound-eye processing and the monocular processing to be switched to the other one of the compound-eye processing and the monocular processing, on a basis of a result of a comparison between a measured predetermined physical amount and a predetermined threshold value.

(11) A control method for an image pickup control apparatus, including:
a comparison step of comparing a measured predetermined physical amount and a predetermined threshold value and supplying a predetermined control signal to a signal processing unit on a basis of a result of the comparison; and
a switch step of switching, in accordance with the predetermined control signal, one of compound-eye processing for synthesizing a plurality of pieces of image data by carrying out signal processing on each of the plurality of pieces of image data and monocular processing for carrying out the signal processing on any one of the plurality of pieces of image data to the other one of the compound-eye processing and the monocular processing.

(1A) An image pickup control apparatus, comprising:
a signal processor configured to execute compound processing that synthesizes a plurality of pieces of image data and monocular processing that processes any one of the plurality of pieces of image data; and
a controller configured to perform a comparison of a physical amount to a threshold value and cause the signal processor to execute either the compound processing or the monocular processing on a basis of the comparison.

(2A) The image pickup control apparatus according to (1A), wherein
the physical amount is a measured physical condition that fluctuates in an image pickup environment.

(3A) The image pickup control apparatus according to (2A), further comprising:
a temperature sensor that measures a temperature as the physical amount,
wherein
the controller causes the signal processor to switch the compound processing to the monocular processing in a case where the temperature is higher than the threshold value.

(4A) The image pickup control apparatus according to (2A), wherein
the controller determines an amount of incident light as the physical amount, and
causes the signal processor to switch the compound processing to the monocular processing in a case where the amount of incident light is larger than the threshold value.

(5A) The image pickup control apparatus according to (1A), wherein
the controller determines a movement amount of a subject as the physical amount, and
causes the signal processor to switch the monocular processing to the compound processing in a case where the movement amount is larger than the threshold value.

(6A) The image pickup control apparatus according to (1A), wherein
the plurality of pieces of image data are images captured in synchronization with predetermined synchronization signals, and
the signal processor switches one of the compound processing and the monocular processing to the other one of the compound processing and the monocular processing after executing transition processing for performing a synthesis while changing a synthesis rate every time a predetermined cycle passes.

(7A) The image pickup control apparatus according to (2A), wherein
the controller causes the signal processor to gradually switch the compound processing to the monocular processing once it is determined that the physical amount is higher than the threshold value.

(8A) The image pickup control apparatus according to (2A), wherein
after the controller causes the signal processor to switch to the monocular processing upon determination that the physical amount is higher than the threshold value, the controller causes the monocular processing to continue the monocular processing until the physical amount decreases to a second threshold value that is lower than the threshold value.

(9A) The image pickup control apparatus according to (2A), wherein
the controller causes the signal processor to terminate both the compound processing and the monocular processing when the physical amount increases to a third threshold value that is higher than the threshold value.

(10A) The image pickup control apparatus according to (1A), wherein
the plurality of pieces of image data comprise a first piece of image data captured by a first camera module and a second piece of image data captured by a second camera module.

(11A) The image pickup control apparatus according to (1A), wherein
the physical amount is a remaining amount of capacity of a battery that supplies power for the image pickup control apparatus.

(12A) The image pickup control apparatus according to (1A), wherein
the physical amount is determined according to a voltage value that varies in correspondence with the physical amount.

(13A) An image pickup apparatus, comprising:
at least one lens configured to capture a plurality of pieces of image data; and
a signal processor configured to execute compound processing that synthesizes the plurality of pieces of image data or monocular processing that carries out processing on any one of the plurality of pieces of image data; and
a controller configured to cause the signal processor to execute either the compound processing or the monocular processing, on a basis of a result of a comparison between a physical amount and a threshold value.

(14A) An image pickup control apparatus, comprising:
a signal processor configured to synthesize a plurality of pieces of image data to produce synthesized image data;
a transmission unit configured to execute either single-channel transmission processing for transmitting the synthetized image data together with any one piece of image data of the plurality of pieces of image data via a single communication channel or multiple-channel transmission processing for respectively transmitting the any one piece of image data and the synthetized image data via mutually different communication channels; and
a controller configured to cause the signal processor to execute either the single-channel transmission processing or the multiple-channel transmission processing, on a basis of a result of a comparison between a physical amount and a threshold value.

(15A) The image pickup apparatus according to (14A), further comprising:
scaling processing circuitry that reduces any one of the plurality of pieces of image data,
wherein
the controller controls the scaling processing circuitry to change a reduction ratio on the basis of the result of the comparison between the physical amount and the threshold value.

(16A) The image pickup apparatus according to (14A), further comprising:
synchronization control circuitry that supplies a predetermined synchronization signal,
wherein
each of the plurality of pieces of image data is image data that has been captured in synchronization with the predetermined synchronization signal, and
the controller controls the synchronization control circuitry to change a frequency of the predetermined synchronization signal on the basis of the result of the comparison between the physical amount and the threshold value.

(17A) A control method for an image pickup control apparatus, comprising:
controlling a signal processor that is configured to execute compound processing that synthesizes a plurality of pieces of image data and monocular processing that processes any one of the plurality of pieces of image data; and
performing a comparison of a physical amount to a threshold value and causing the signal processor to execute either the compound processing or the monocular processing on a basis of the comparison.

(18A) A non-transitory computer readable medium storing program code for processing image data, the program code being executable by a processor to perform operations comprising:
controlling a signal processor that is configured to execute compound processing that synthesizes a plurality of pieces of image data and monocular processing that processes any one of the plurality of pieces of image data; and
performing a comparison of a physical amount to a threshold value and causing the signal processor to execute either the compound processing or the monocular processing on a basis of the comparison.

REFERENCE SIGNS LIST 100 image pickup apparatus
110, 130 camera module
111, 131 optical system
120, 140 solid-state image pickup device
121, 141 microlens
122 color filter
123, 143 light reception device
124, 144 wiring layer
150 application processor
151 reception unit
152 image recognition unit
153 memory
200 image pickup control apparatus
210 control unit
220 temperature sensor
230 statistics processing unit 240 signal processing unit
241 color image signal processing unit
242 de-mosaic processing unit
243 detection unit
244 exposure control unit
245 focus control unit
246 movement amount measurement unit
247 monochrome image signal processing unit
248 transmission unit
249 scaling processing unit
250 synthesis processing unit
251 positioning processing unit
252 YC conversion unit
253 luminance signal synthesis unit
254 RGB conversion unit
255 switch
260 synchronization control unit
12031 image pickup unit

The invention claimed is:

1. An image pickup control apparatus, comprising:
a controller configured to control a signal processor to switch between compound processing that synthesizes a plurality of pieces of image data and monocular processing that processes any one of the plurality of pieces of image data, in response to comparisons of a measured value to a first threshold value and a second threshold value that is lower than the first threshold value; and
wherein after the controller causes the signal processor to continue to execute the compound processing until the measured value is higher than the first threshold value, the controller causes the signal processor to return to the compound processing from the monocular processing in response to the measured value becoming lower than the second threshold value.

2. The image pickup control apparatus according to claim 1, wherein after determining that the measured value is higher than the first threshold value, the controller causes the signal processor to enter a transition processing followed by the monocular processing.

3. The image pickup control apparatus according to claim 2, wherein the transition processing includes gradually changing a synthesis rate for synthesizing the plurality of pieces of image data.

4. The image pickup control apparatus according to claim 1, wherein the measured value corresponds to a physical condition that fluctuates in an image pickup environment.

5. The image pickup control apparatus according to claim 4, wherein the physical condition is temperature.

6. The image pickup control apparatus according to claim 4, wherein the physical condition is an amount of incident light.

7. The image pickup control apparatus according to claim 4, wherein the physical condition is a movement amount of a subject.

8. The image pickup control apparatus according to claim 4, wherein the physical condition is a remaining amount of capacity of a battery that supplies power for the image pickup control apparatus.

9. The image pickup control apparatus according to claim 1, wherein the controller causes the signal processor to terminate both the compound processing and the monocular processing when the measured value increases to a third threshold value that is higher than the first threshold value.

10. An image pickup apparatus, comprising:
at least one lens configured to capture a plurality of pieces of image data; and
a controller configured to control signal processing to switch between compound processing that synthesizes the plurality of pieces of image data and monocular processing that processes any one of the plurality of pieces of image data, in response to comparisons of a measured value to a first threshold value and a second threshold value that is lower than the first threshold value,
wherein after the controller causes the signal processing to continue to execute the compound processing until the measured value is higher than the first threshold value, the controller causes the signal processing to return to the compound processing from the monocular processing in response to the measured value becoming lower than the second threshold value.

11. The image pickup apparatus according to claim 10, wherein after determining that the measured value is higher than the first threshold value, the controller causes the signal processing to enter a transition processing followed by the monocular processing.

12. The image pickup apparatus according to claim 11, wherein the transition processing includes gradually changing a synthesis rate for synthesizing the plurality of pieces of image data.

13. The image pickup apparatus according to claim 10, wherein the measured value corresponds to a physical condition that fluctuates in an image pickup environment.

14. The image pickup apparatus according to claim 13, wherein the physical condition is temperature.

15. A non-transitory computer readable medium storing program code for processing image data, the program code being executable by a processor to perform operations comprising: controlling a signal processor to switch between compound processing that synthesizes a plurality of pieces of image data and monocular processing that processes any one of the plurality of pieces of image data, in response to comparisons of a measured value to a first threshold value and a second threshold value that is lower than the first threshold value; and after controlling the signal processor to continue to execute the compound processing until the measured value is higher than the first threshold value, causing the signal processor to return to the compound processing from the monocular processing in response to the measured value becoming lower than the second threshold value.

16. The non-transitory computer readable medium according to claim 15, wherein the operations further comprise: after determining that the measured value is higher than the first threshold value, causing the signal processor to enter a transition processing followed by the monocular processing.

17. The non-transitory computer readable medium according to claim 16, wherein the transition processing includes gradually changing a synthesis rate for synthesizing the plurality of pieces of image data.

18. The non-transitory computer readable medium according to claim 15, wherein the measured value corresponds to a physical condition that fluctuates in an image pickup environment.

19. The non-transitory computer readable medium according to claim 18, wherein the physical condition is temperature.

* * * * *